(12) United States Patent
Watanabe et al.

(10) Patent No.: US 8,340,464 B2
(45) Date of Patent: Dec. 25, 2012

(54) IMAGE PROCESSING METHOD AND IMAGE PROCESSING DEVICE

(75) Inventors: Yuri Watanabe, Kawasaki (JP); Masayoshi Shimizu, Kawasaki (JP); Kimitaka Murashita, Kawasaki (JP); Ayu Miyakawa, Kawasaki (JP); Kaoru Chujo, Kawasaki (JP); Takashi Wakamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1291 days.

(21) Appl. No.: 12/076,267

(22) Filed: Mar. 14, 2008

(65) Prior Publication Data

US 2008/0187234 A1   Aug. 7, 2008

Related U.S. Application Data

(63) Continuation of application No. PCT/JP2006/315121, filed on Jul. 31, 2006.

(30) Foreign Application Priority Data

Sep. 16, 2005   (WO) .................. PCT/JP2005/017147

(51) Int. Cl.
- *G06K 9/40* (2006.01)
- *G06K 9/36* (2006.01)
- *G06K 15/00* (2006.01)
- *G09G 5/00* (2006.01)

(52) U.S. Cl. ....... 382/284; 382/254; 382/276; 358/1.18; 345/619; 345/629; 345/634

(58) Field of Classification Search .................. 382/254, 382/284; 358/1.18; 345/619, 629, 634
See application file for complete search history.

(56) References Cited

U.S. PATENT DOCUMENTS

| | | | | |
|---|---|---|---|---|
| 6,453,069 B1 * | 9/2002 | Matsugu et al. | ............... | 382/173 |
| 6,870,945 B2 * | 3/2005 | Schoepflin et al. | ........... | 382/103 |
| 6,898,332 B2 * | 5/2005 | Matsuhira | ..................... | 382/284 |
| 7,301,563 B1 | 11/2007 | Kakinuma et al. | | |
| 7,349,119 B2 * | 3/2008 | Tsukioka | ..................... | 358/1.18 |
| 7,664,293 B2 * | 2/2010 | Ikeda | ............................ | 382/107 |
| 2005/0157949 A1 | 7/2005 | Aiso et al. | | |

(Continued)

FOREIGN PATENT DOCUMENTS

JP   8-55222   2/1996

(Continued)

OTHER PUBLICATIONS

Japanese Office Action issued on Apr. 13, 2010 in corresponding Japanese Patent Application 2007-535392.

*Primary Examiner* — Matthew Bella
*Assistant Examiner* — Jose M Torres
(74) *Attorney, Agent, or Firm* — Staas & Halsey LLP

(57) ABSTRACT

In a device for combining a plurality of images having a same photograph range, a position shift between the images having the same photograph range is detected, and the position shift of the images is corrected, and after the position shift is corrected, similarity of the respective portions between the images is evaluated, and the image combining method is changed according to the similarity evaluation. Therefore it is possible to create an image having no position shift due to the shaking of a camera and object blurring due to the movement of the object. Moreover, whether the images are combined or not is determined according to the similarity, hence the processing load is reduced and an image having no object blurring can be created.

37 Claims, 26 Drawing Sheets

U.S. PATENT DOCUMENTS

2006/0256397 A1 * 11/2006 Cui .............................. 358/450

FOREIGN PATENT DOCUMENTS

| | | |
|---|---|---|
| JP | 10-320535 | 12/1998 |
| JP | 11-4377 | 1/1999 |
| JP | 11-185018 | 7/1999 |
| JP | 2000-50151 | 2/2000 |
| JP | 2000-224460 | 8/2000 |
| JP | 2002-077725 | 3/2002 |
| JP | 2003-134385 | 5/2003 |
| JP | 2003-143484 | 5/2003 |
| JP | 2004-32592 | 1/2004 |
| JP | 2004-194106 | 7/2004 |
| JP | 2005-136679 | 5/2005 |

* cited by examiner

FIG. 7

|  | IMAGE 1 | IMAGE 2 | IMAGE 3 |
|---|---|---|---|
| AREA WITH MOVEMENT | 0 | 1 | 0 |
| AREA WITHOUT MOVEMENT | 0.25 | 0.5 | 0.25 |

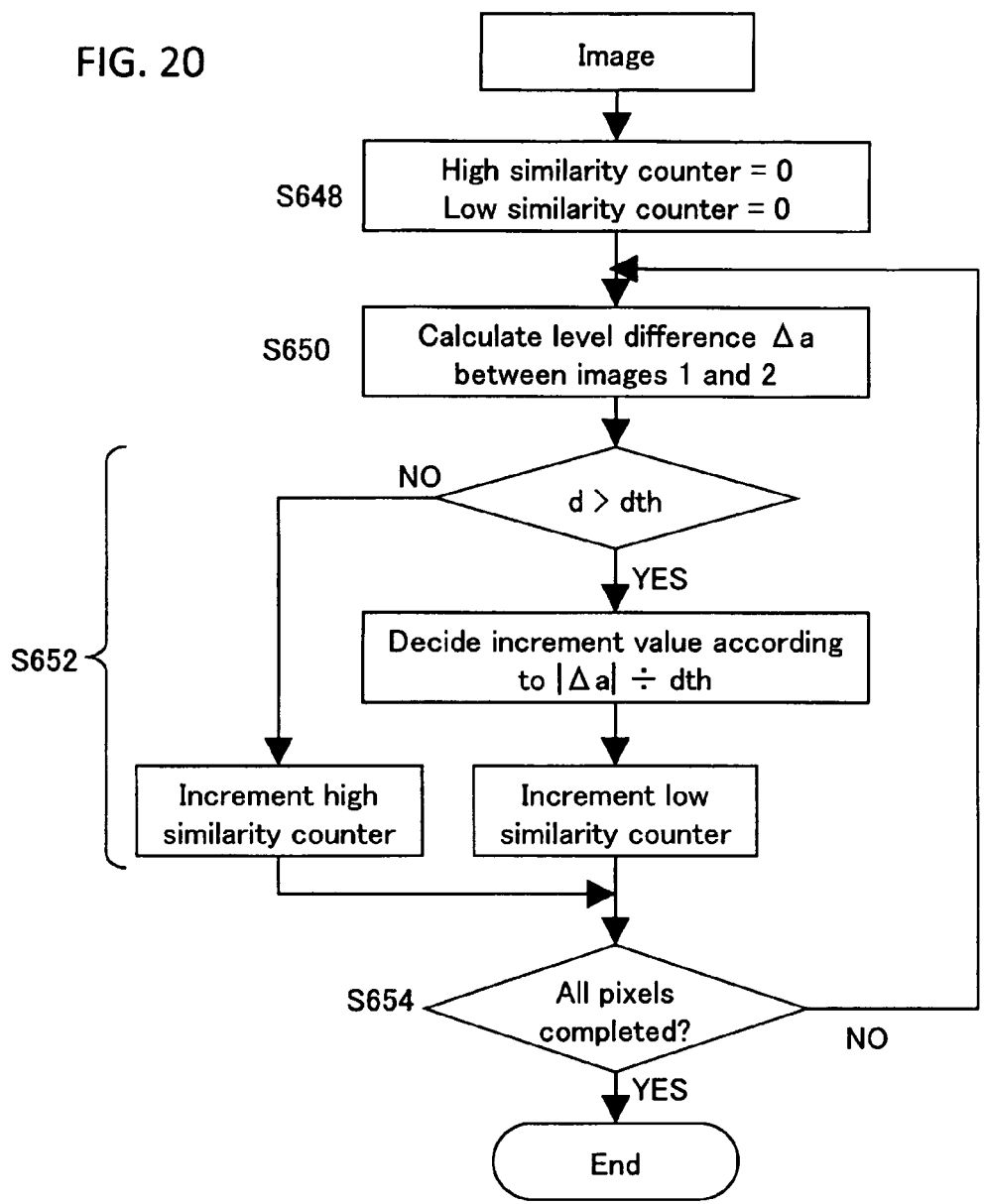

FIG. 33
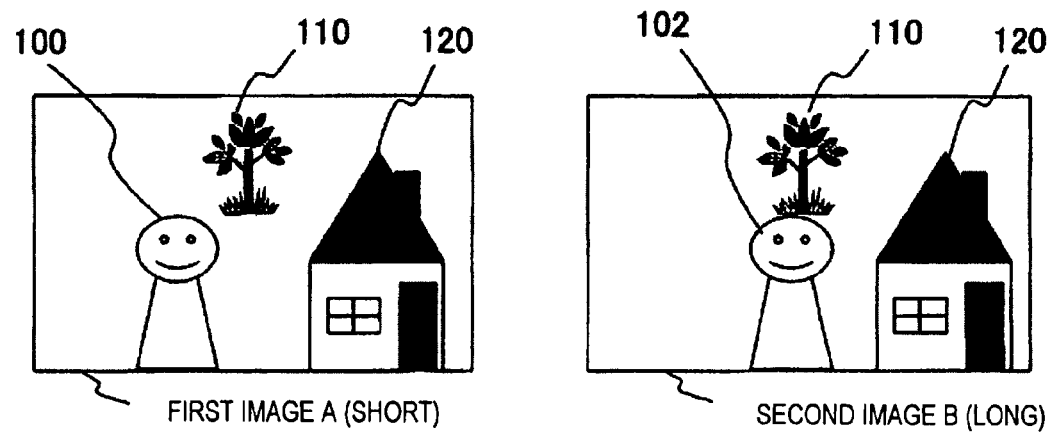
FIRST IMAGE A (SHORT)    SECOND IMAGE B (LONG)
POSITION SHIFT (MOVEMENT) DIRECTION
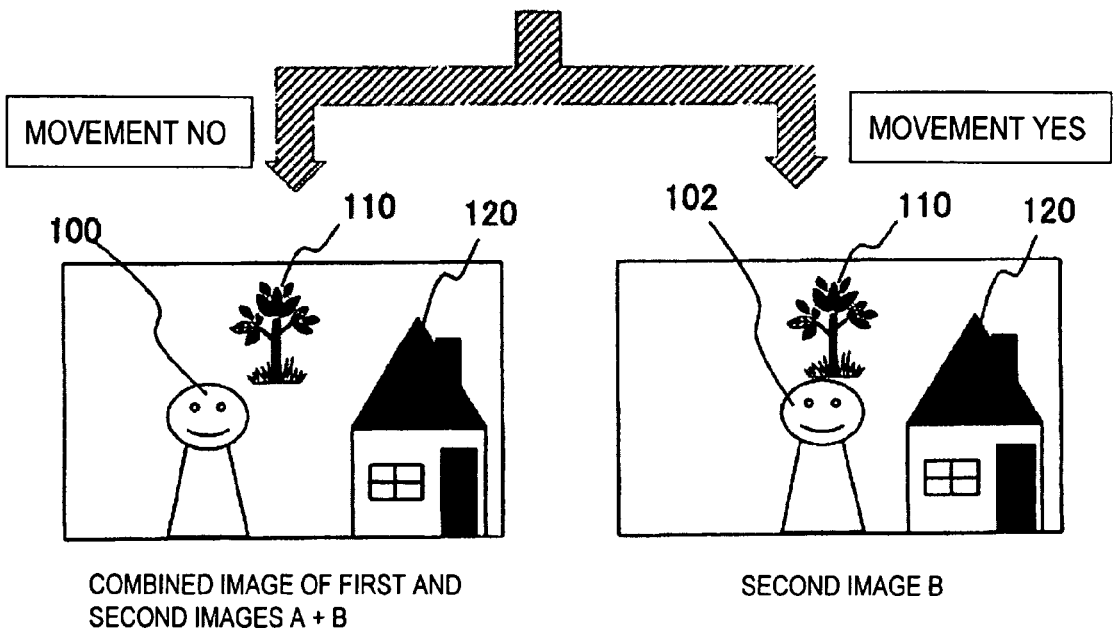
MOVEMENT NO    MOVEMENT YES
COMBINED IMAGE OF FIRST AND SECOND IMAGES A + B    SECOND IMAGE B

IMAGE PROCESSING METHOD AND IMAGE PROCESSING DEVICE

CROSS REFERENCE TO RELATED APPLICATIONS

This application is a continuation of International Application No. PCT/JP2006/315121, filed on Jul. 31, 2006, now pending, herein incorporated by reference. Further, this application is based upon and claims the benefit of priority from the prior International Patent Application No. 2005/017147, filed on Sep. 16, 2005, the entire contents of which are incorporated herein by reference.

TECHNICAL FIELD

The present invention relates to an image processing method and image processing device for improving image quality by combining a plurality of images captured by an imaging device such as a digital camera, and more particularly to an image processing method and image processing device for improving image quality by combining images captured consecutively.

BACKGROUND ART

Along with the recent spread of digital image equipment, such as digital cameras, it is becoming possible to acquire images with excellent image quality by digital image processing. In the case of portable image sensing equipment, such as a digital camera, the so called "hand-shake correction processing" is available, which exhibits an effectiveness to improve the image quality of portable image equipment.

Examples of the hand-shake correction method are optical shake correction and shake correction by image processing. The former is for correcting shaking by mechanically detecting blurring and moving the optical system, and this is used for equipment where the space for mounting this mechanism is available. The latter, as implementing by image processing, is suitable for compact equipment where the mounting space is limited. In the case of a compact digital camera or portable telephone with a camera, images captured consecutively in a short exposure time are combined (added). An image captured in a short exposure time is less affected by hand shaking, but the light quantity is insufficient, so a plurality of images continuously shot are combined, and images of which noise is low and shake is suppressed can be generated.

As the combining method (image processing method), a first prior art which was proposed is a method of detecting the position shift of two entire images, A and B, correcting the position shift of the two entire images A and B according to a common position shift parameter of the two entire images, and combining the two images A and B (e.g. see Patent Document 1), as shown in FIG. 32.

A second prior art which was proposed is a method for acquiring a long time exposure image B and a short time exposure image A consecutively, detecting whether the object moved, and selecting the long time exposure image B if there is movement, and combining the two images A and B if there is no movement (e.g. see Patent Document 2), as shown in FIG. 33. A third prior art which was proposed is acquiring a long time exposure image (for background) B and a stroboscopic image (for object) A consecutively, detecting the blurring of the boundary area between background and object images, and processing the boundary area when the two images are combined so that the boundary area does not become unnatural (e.g. see Patent Document 3). In this processing method, an area where the blurring of the object image, which occurred when the object moved, is replaced with the pixels of image B captured by the stroboscope.

Patent Document 1: Japanese Patent Application Laid-Open No. H11-185018
Patent Document 2: Japanese Patent Application Laid-Open No. 2000-050151
Patent Document 3: Japanese Patent Application Laid-Open No. 2004-194106

DISCLOSURE OF THE INVENTION

In the case of the first prior art, however, the entire image is positioned with the position shift amount of the entire image, so if a shift amount of a part of the image is different from a shift amount of the other part of the image, the position of one part of the image may not match, even if the position of the other part of the image matches. For example, a target object (e.g. an individual) other than background, which occupies most of the entire image, is assumed to be still in the first prior art.

Because of this, as FIG. 32 shows, if the object (individual) 100 moved with respect to the backgrounds 110 and 120 in images A and B which are shot consecutively, and the positions of the two images A and B are attempted to be matched, the positions of the backgrounds 110 and 120 can be matched, but the positions of the objects 100 and 102 cannot be matched, and in the combined image C, the objects 100 and 102 become a double image, and a multi-shot is locally generated, and a good quality combined image cannot be acquired.

In the case of the second prior art, selecting a long time exposure image when the image has movement means that a blurred image is included in the long time exposure image itself, since a moving object is exposed for a long time, so it is likely that a multi-shot of the moved portion is locally generated.

In the case of the third prior art, the blurred object area is detected when the object moves, and this area is replaced with pixels of an image captured using a stroboscope for processing the boundary area, so the object size becomes bigger than the original. If the movement of the object is major, the image may become quite unnatural.

With the foregoing in view, it is an object of the present invention to provide an image processing method and an image processing device to implement an improvement of image quality by image combining, even if an object, other than a background, moves.

It is still another object of the present invention to provide an image processing method and an image processing device to acquire an image of an object that is not blurred, even if the object, other than a background, moves.

It is still another object of the present invention to provide an image processing method and an image processing device to prevent the generation of a multi-shot with preventing an increase of the processing load, even if an object, other than a background, moves.

To achieve these objects, an image processing method of the present invention is an image processing method for overlapping and combining a plurality of images sharing a photograph range, having: a position shift detection step of calculating a position shift parameter between the images; a position shift correction step of correcting the position shift between the images using the position shift parameter; a similarity evaluation step of evaluating the similarity of positions of the plurality of images after the correction between the images for each portion of the images; and a combining step of changing a combining method or a combining parameter of the images according to the similarity evaluation result, and combining the plurality of images after correction.

An image processing device of the present invention has a memory for storing a plurality of images sharing a photograph range, and a processing unit for calculating a position shift parameter between the plurality of images and correcting the position shift between the images using the position shift parameter, wherein the processing unit evaluates similarity for each portion of the images after correction, changes a combining method or a combining parameter according to the similarity, and combines the images after correction.

According to the present invention, when a plurality of images are combined, the position shift between the images is detected and corrected, similarity of the images is evaluated after the position shift is corrected, and the image combining method is changed according to the similarity, so an image having no position shift, due to the shaking of a camera, and an object blurring, due to the movement of the object, can be created.

In the present invention, it is preferable that the similarity evaluation step is a step of evaluating whether the similarity between portions of the images is high or low, and the combining step further has a step of combining images using pixel values of a part of the images for an area the similarity of which is low, and using pixel values of the plurality of images for an area the similarity of which is high. Since images are combined using pixel values of a part of the images for an area of the similarity which is low and using pixel values of the plurality of images for an area the similarity of which is high, an image having no position shift, due to the shaking of a camera, and object blurring, due to the movement of the object, can be created.

In the present invention, it is also preferable that the similarity evaluation step further has a step of calculating at least a level difference between the portions of the images and evaluating the similarity. Since the similarity is judged using at least the level difference, the similarity can be easily judged.

In the present invention, it is also preferable that the similarity evaluation step further has a step of calculating a level difference and the edge intensity of the portions of the images, and evaluating the similarity by the level difference and the edge intensity. Since the level difference and the edge intensity are referred to when the similarity of images is evaluated, the level of similarity can be accurately evaluated.

In the present invention, it is also preferable that the similarity evaluation step further has a step of evaluating that the similarity is low when the calculated level difference is great and the edge intensity is low, and evaluating that the similarity is high when the level difference is small and the edge intensity is high. Since the similarity is evaluated as lower as the edge intensity is lower and the level difference is greater, detection error can be prevented in an edge portion where a slight position shift (e.g. one pixel shift), due to a minor external factor, could generate a radical level difference.

It is also preferable that the present invention further has a step of removing noise from an area of which the similarity is low in the combined image. In an area the similarity of which is high, noise can be removed by image combining, but in an area the similarity of which is low, noise may standout compared with an area the similarity of which is high, since the number of images to be combined is small, so image quality can be improved by removing noise from the area the similarity of which is low.

It is also preferable that the present invention further has a step of correcting a similarity evaluation of the similarity evaluation result, in order to improve image quality of the combined image. Since the combining method is changed according to the similarity, the image quality difference could be generated between a portion the similarity of which is high and a portion the similarity of which is low, so the similarity evaluation is corrected so as to improve the image quality.

In the present invention, it is also preferable that the similarity evaluation correction step further has a step of detecting that a portion the similarity of which is low exists as an isolated point in a portion the similarity of which is high, and changing the portion where the similarity is low to the portion the similarity of which is high. After the similarity is evaluated, the similarity evaluation is corrected, so that the image is further improved, and if a portion the similarity of which is low exists as an isolated point in a portion the similarity of which is high, this portion is removed. In other words, the micro area need not be handled as an area the similarity of which is low, separately from a peripheral area, since visibility is low.

In the present invention, it is also preferable that the similarity evaluation correction step further has a step of detecting that an area the similarity of which is high exists around an area the similarity of which is low, and executing a processing for expanding the portion the similarity of which is low. After the similarity is evaluated, the similarity evaluation is corrected so that the image is further improved, and if an area the similarity of which is high coexists around an area the similarity of which is low, the portion the similarity of which is low is expanded so as to prevent the generation of an unnatural image at the boundary of the area where the similarity is low and the area the similarity of which is high when the images are combined.

In the present invention, it is also preferable that the similarity evaluation correction step further has a step of detecting that a portion the similarity of which is high exists in an area surrounded by a portion the similarity of which is low, and changing the portion the similarity of which is regarded as high to a portion the similarity of which is low. If an object moves in an area being photographed, in the area around the object, the image level value changes greatly, so the area is normally judged as an area the similarity of which is low, but the area within the object tends to be judged as an area the similarity of which is high, particularly when the change of color of the object is small. This means that in a same moving object, the similarity is judged as low in a peripheral area and similarity is judged as high in the area within the object. In such a case, it is more natural if a same processing is performed for the entire area of this object. Hence if a portion the similarity of which is high exists in an area surrounded by a portion the similarity of which is low, the area where the similarity is regarded as high is changed to an area where similarity is low.

The present invention is also an image processing method for overlapping and combining a plurality of images sharing a photograph range, having: a position shift detection step of calculating a position shift parameter between images; a position shift correction step of correcting the position shift between the images using the position shift parameter; a similarity evaluation step of evaluating the similarity of portions of the plurality of images after the correction between images for each portion of the images; a judgment step of judging whether to execute combining processing according to the similarity evaluation result; a combining step of combining the plurality of images after the correction if judgment is made that the combining processing is executed; and a selection step of selecting one image out of the plurality of images if judgment is made that the combining processing is executed.

In the present invention, it is preferable that the combining step further has a combining step based on a simple average or a weighted average of the pixel level values of the plurality of images.

In the present invention, it is also preferable that the combining step further has a combining step based on the addition of a linear brightness signal of the pixel level values of the plurality of images.

In the present invention, it is also preferable that the similarity evaluation step further has a similarity evaluation step based on a difference of the pixel level values of the plurality of images.

In the present invention, it is also preferable that the similarity evaluation step further has a step of comparing a difference of the pixel level values of the plurality of images with a threshold, and judging the similarity.

In the present invention, it is also preferable that the similarity evaluation step further has a step of comparing a difference of the pixel level values of the plurality of images with a threshold determined according to an inclination of the level of the image, and evaluating the similarity.

In the present invention, it is also preferable that the judgment step further has a step of judging according to the number of pixels the similarity of which is judged as low.

In the present invention, it is also preferable that the judgment step further has a step of judging according to the result of adding the number of pixels, the similarity of which is judged as low, with weight based on a level difference between pixels.

In the present invention, it is also preferable that the judgment step further has a step of judging according to the result of adding the number of pixels, the similarity of which is judged as low, with weight based on a level difference between pixels.

When a plurality of images are combined, a position shift between images is detected and corrected, and after the position shift is corrected the similarity of the images is evaluated, and the image combining method is changed according to the similarity, so it is possible to create an image having no position shift, due to the shaking of a camera, and object blurring, due to the movement of the object. Moreover, whether the images are combined or not is determined according to the similarity, so the processing load is reduced and an image having no object blurring can be created.

BRIEF DESCRIPTION OF THE DRAWINGS

FIG. 7 is a diagram showing a combining method in FIG. 3;

FIG. 20 is a processing flow chart of a third embodiment of the image processing of the present invention;

FIG. 21 is a diagram depicting an increment table in FIG. 20;

FIG. 33 is a diagram depicting a second image combining method according to a prior art.

EXPLANATION OF REFERENCE NUMERALS

Figure 1:
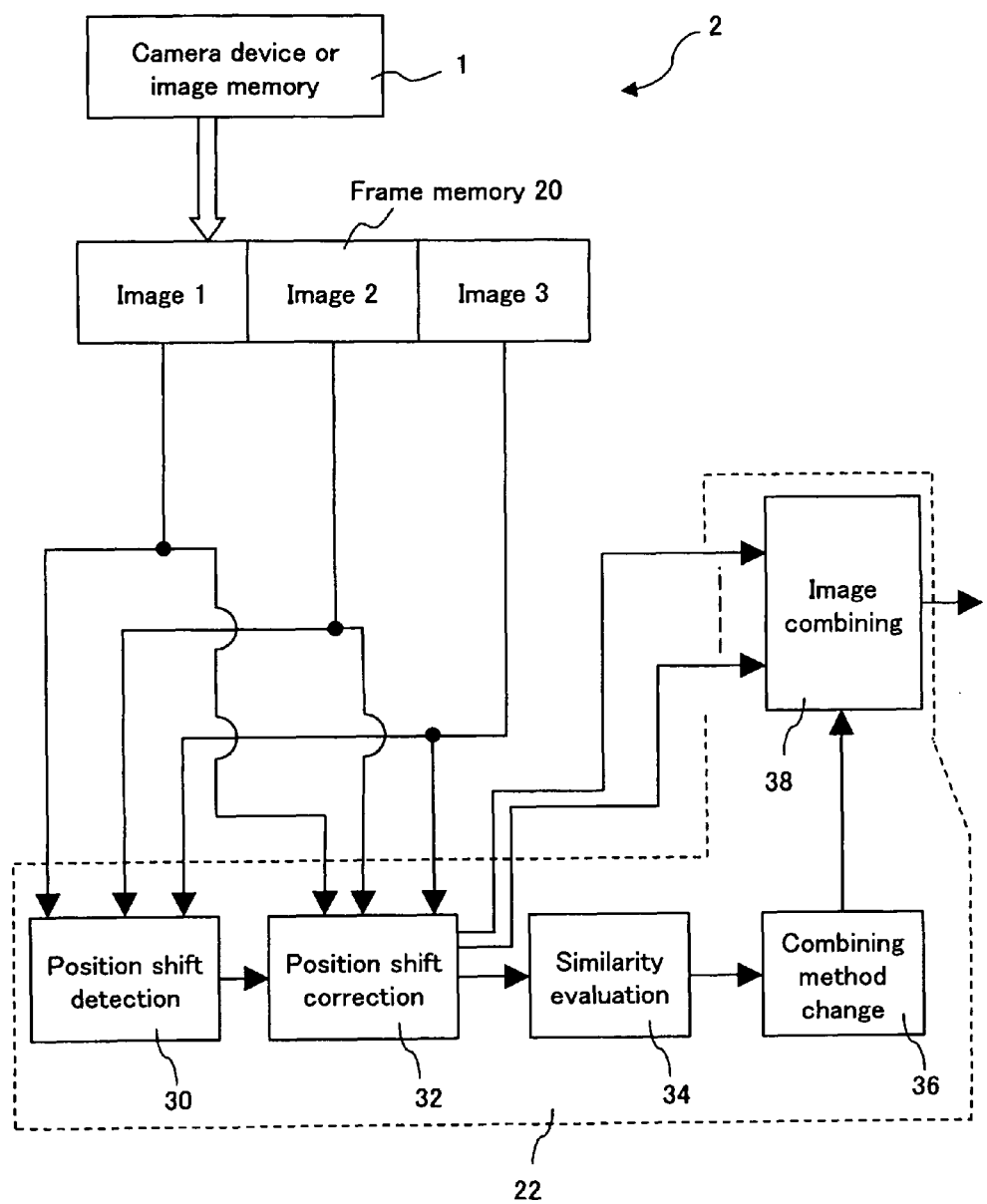
FIG. 1 is a block diagram depicting an image processing device of an embodiment of the present invention.

1 Camera device or image memory
2 Image processing device
20 Frame memory
22 Processing unit
30 Position shift detection section
32 Position shift correction section
34 Similarity evaluation section
36 Combining method change section
38 Image composing section

PREFERRED EMBODIMENTS OF THE INVENTION

The present invention will now be described in the sequence of an image processing device, first embodiment of image processing method, similarity evaluation correction method, second embodiment of image processing method, third embodiment of image processing method, fourth embodiment of image processing method, fifth embodiment of image processing method, and other embodiments, but the present invention is not limited to these embodiments.

Image Processing Device

Figure 2:
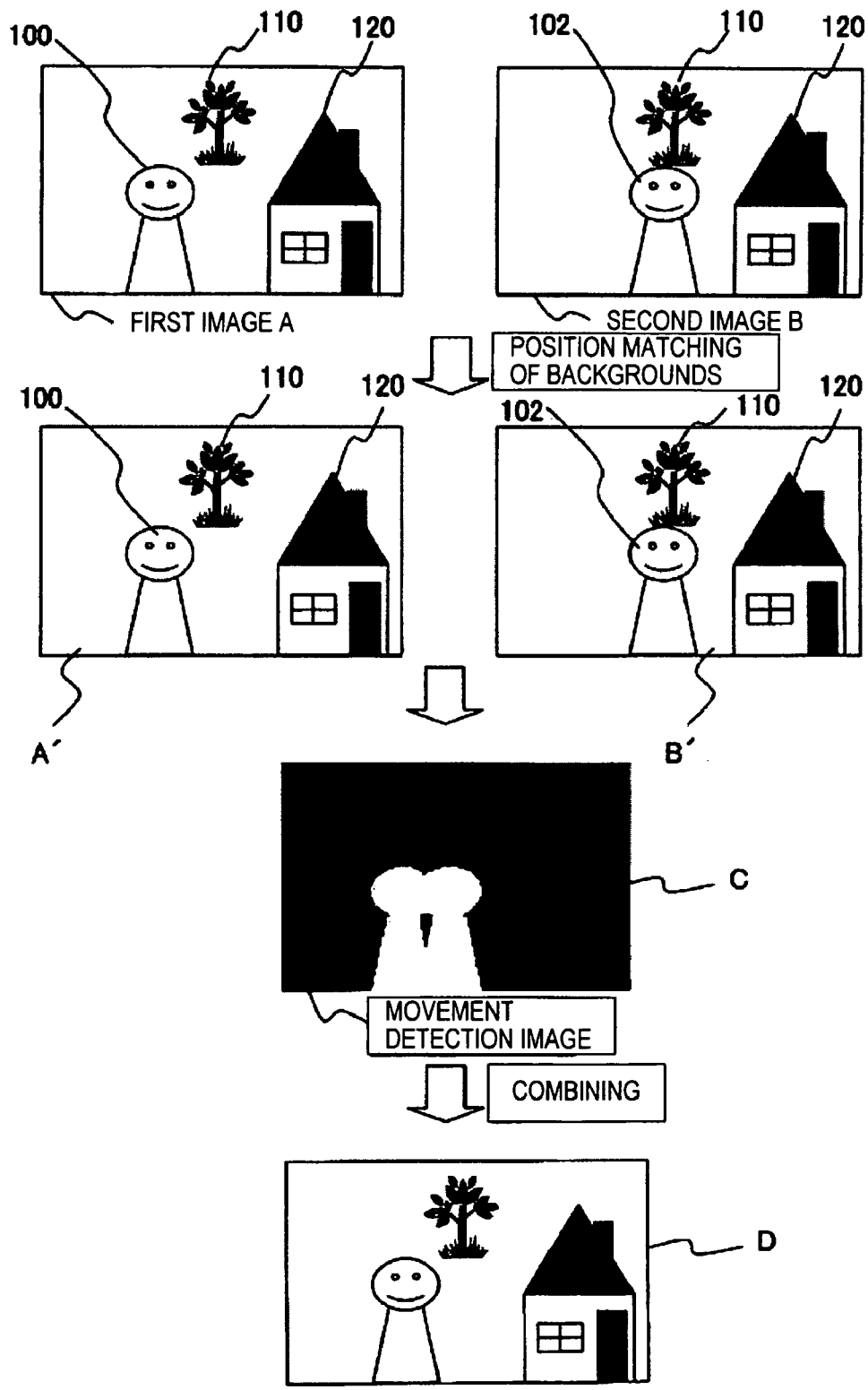
FIG. 2 is a diagram depicting the operation of the image processing device of an embodiment of the present invention.

FIG. 1 is a block diagram depicting an image processing device according to an embodiment of the present invention, and FIG. 2 is a diagram depicting the operation thereof. As FIG. 1 shows, an image processing device 2 is built into a digital camera (including portable equipment with a built in camera), or built into a personal computer which is connected to a digital camera.

When the image processing device 2 is built into a digital camera or a portable equipment with a built in camera (e.g. cell phone), for example, the image processing device 2 is built into the digital camera or the portable equipment with a built in camera for processing images from a camera device (image sensing element) 1. When the image processing device 2 is built into a personal computer, the image processing device 2 is constructed as a program for processing images from a digital camera or from a memory 1 in a digital camera.

As FIG. 1 shows, the image processing device 2 is comprised of a frame memory 20 and a processing unit (e.g. image processing processor) 22, for example. A plurality of images sharing a photograph range sent from a camera device or an image memory 1 are stored in each frame memory 20. The processing unit 22 executes processing to overlap and combine the plurality of images in the frame memory 22.

The processing unit 22 comprises a position shift detection section 30 which executes a position shift detection step for calculating a position shift parameter between images, a position shift correction section 32 which executes a position shift correction step for correcting a position shift between images using the position shift parameter, a similarity evaluation section 34 which executes a similarity evaluation step for evaluating similarity of respective portions (areas) between images after correction, a combining method change section 36 which executes a combining method change step for changing a combining method or a combining parameter according to the evaluated similarity, and an image combining section 38 which combines images after the position shift correction according to the combining parameter.

The operation in the configuration in FIG. 1 will now be described with reference to FIG. 2. FIG. 2 shows an example when consecutive two-shot images A and B are combined, where after the first image A was shot, an object (an individual) 102 moved to the left and a second image B is shot. First the position shift detection section 30 detects a position shift of the two images (captured image screen data) A and B in the frame memory 20. For example, characteristic points are extracted and traced by a known KLT (Kanade-Lucas-Tomasi) transform, and a position shift of the entire image is detected.

The position shift correction section 32 corrects the position shift of the images A and B using a detected parameter. As FIG. 2 shows, the position shift of the background portions 110 and 120 of images after correction A' and B' is corrected by the position shift correction of the entire image, but the position shift of an area, which moved exceeding the amount of the position shift of the entire image (object 102, which is an individual in this case), cannot be corrected.

The similarity evaluation section 34 evaluates the similarity between the images A' and B' after the position shift correction. For example, the similarity evaluation section 34 calculates the level change and edge intensity of each pixel of the images A' and B', and judges whether the similarity is high or low. According to the judgment result of the similarity evaluation section 34, the image combining method change section 36 instructs the image combining section 38 to use pixel values of one of the images for an area of which the similarity is low, and use pixel values of a plurality of images for an area of which the similarity is high. Or the image composing method change section 36 judges the size of an area of which the similarity is low, and decides whether the images A' and B' are combined or one image (e.g. B') is selected, depending on the judgment result on the size of the area of which the similarity is low. According to this instruction, the image combining section 38 combines the images A' and B' or selects one image, A' or B', and outputs the result.

In FIG. 2, the evaluation result by the similarity evaluation section 34 is shown by image C, where an area of which the similarity between the images A' and B' is high is shown in black, and an area of which the similarity is low is shown in white. By using pixel values of one of the images (e.g. image A') for the white area of which the similarity is low, and by combining pixel values of the plurality of images A' and B' for the black area of which the similarity is high, an image having no position shift, due to the shaking of a camera, and object blurring, due to the movement of the object (an individual), such as image D, can be created.

First Embodiment of Image Processing Method

Figure 3:
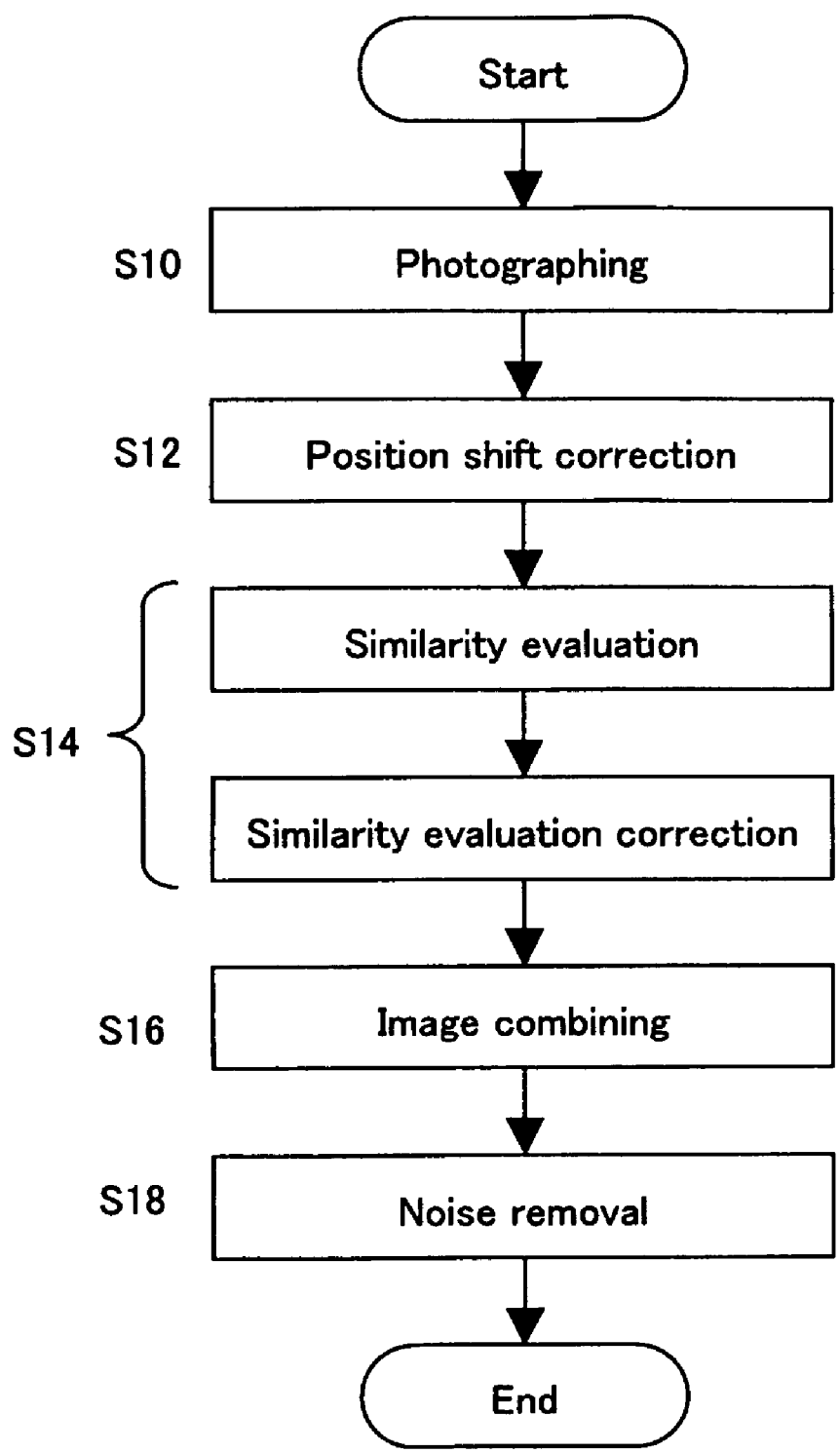
FIG. 3 is a processing flow chart of a first embodiment of the image processing of the present invention.
Figure 4:
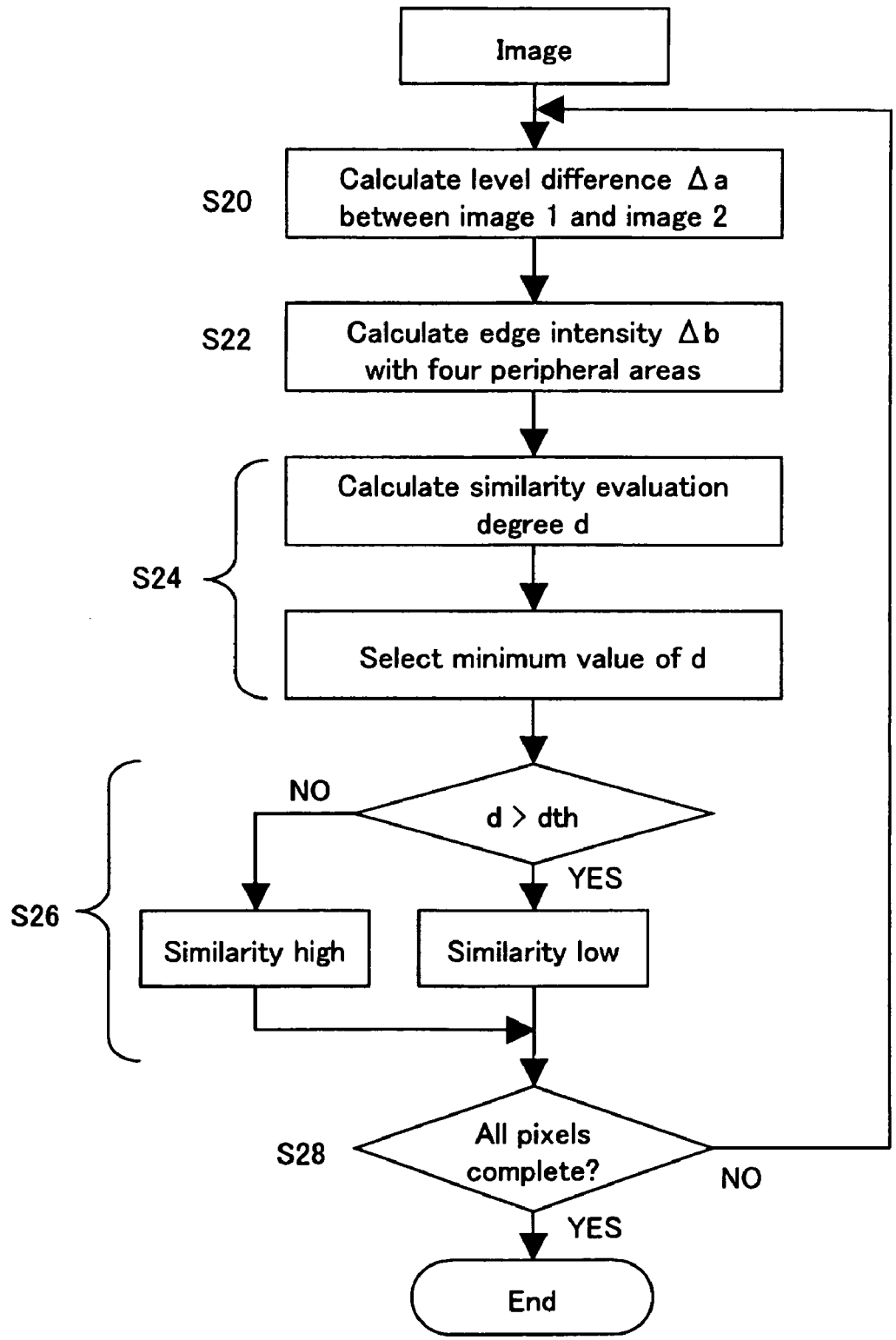
FIG. 4 is a flow chart depicting details of the similarity evaluation processing in FIG. 3.
Figure 5:
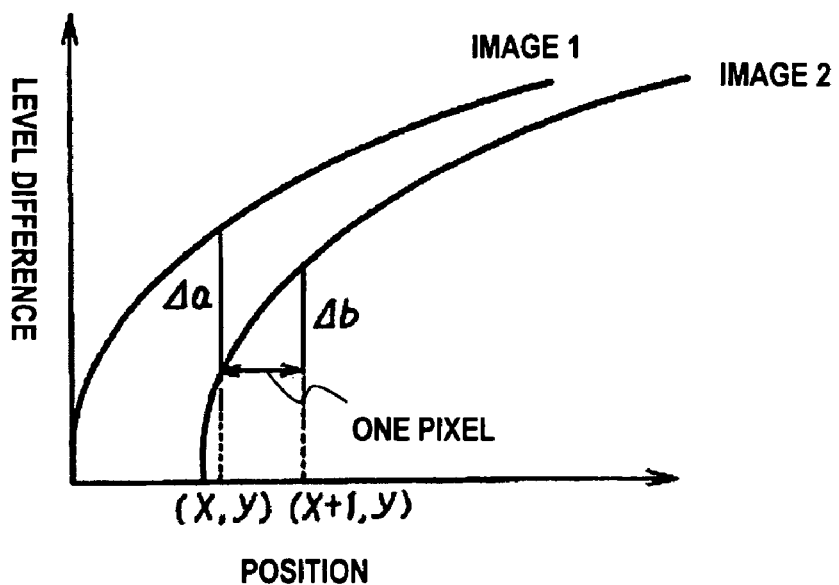
FIG. 5 is a diagram depicting the level difference and edge intensity in FIG. 4.
Figure 6:
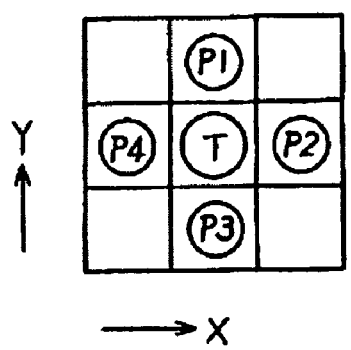
FIG. 6 is a diagram depicting the calculation of the edge intensity in FIG. 4.

FIG. 3 is a processing flow chart of a first embodiment of the image processing of the present invention, FIG. 4 is a flow chart depicting details of the similarity evaluation processing in FIG. 3, FIG. 5 is a graph depicting the level difference and edge intensity in FIG. 4, FIG. 6 is a diagram depicting the calculation of the edge intensity in FIG. 4, and FIG. 7 is a table showing the composing method in FIG. 3.

The image processing of the present embodiment will now be described with reference to FIG. 3.

(S10) Images are shot by a digital camera. In this case, when a shutter is pressed once, the digital camera performs a plurality of short time exposure shooting, and acquires a plurality of consecutive images A and B.

(S12) A processing unit 20 corrects the position shift of two images. Here the above mentioned KLT transform is used. According to the KLT transform, the characteristic points of two images are extracted and tracked to detect the position shift, and the position shift is corrected, as shown in Carlo Tomasi and Takeo Kaneda, "Good Features to Track", (IEEE Conference on Computer Vision and Pattern Recognition, pp. 593-600). The position shift correction method, however, is not limited to this method.

(S14) Then the processing unit 20 evaluates a similarity between images for which position shift was corrected, and distinguishes between an area without movement and an area with movement. To evaluate similarity, a level difference and edge intensity of each pixel of both images are used. In an actual image, a portion of which edge intensity is high may have a great level difference even if the similarity is high, so an evaluation based on both the level difference and edge intensity is preferable. The present invention, however, is not limited to this method, but a method using only the level difference or a method using a difference of incline of the brightness change, for example, may be used. As the level difference and edge intensity shown in FIG. 5 indicate, when a level difference between image 1 and image 2 is $\Delta a$ (sum of absolute values of differences of RGB values), and a level difference between a pixel at an arbitrary position (x, y) of the image 2 and another pixel at a position of one pixel next to this pixel, that is (x+1, y), is an edge intensity $\Delta b$, the similarity is lower as the edge intensity $\Delta b$ is lower and the level difference $\Delta a$ is greater, and the similarity is higher as the edge intensity Δb is higher and the level difference Δa is smaller. In other words, the similarity is high if the edge intensity is high, even if the level difference is great, that is, the similarity is high near the edge of the image pattern. It is preferable to execute the later mentioned correction of the similarity evaluation in this stage.

(S16) The similarity evaluation result between images A and B (1 and 2) is represented by black and white areas, as shown in FIG. 2. The processing unit 20 combines the images. A combining method is changed between a black area (area without movement) and a white area (area with movement). FIG. 7 shows a combining method based on weight, and for a black area (area without movement), an addition of a weighted average of the plurality of images is performed, and for a white area (area with movement), one image (or increasing a weight of one image) is used. For example, in FIG. 7, when three images, image 1, image 2 and image 3, are combined, and the weight of image 2 is set to "1" and the weights of images 1 and 3 are set to "0" in the area with movement, and three images are combined. In other words, only image 2 is used. For the area without movement, the weight of image 2 is set to "0.5", and the weights of images 1 and 3 are set to "0.25" and three images are combined. In other words, a weighted average addition of the plurality of images is determined, and the images are combined with weights. In this case, the weights of the boundary portion may be smoothed so that the boundary of the black and white becomes continuous.

(S18) In the combining result, noise may standout in an area for which one image is used (area with movement), compared with an area where a plurality of images are combined, since averaging is not performed. In such a case, a median filter may be used only for this area with movement, so as to remove isolated points and to remove noise.

This similarity evaluation step in FIG. 3 will now be described in detail with reference to FIG. 4.

(S20) First the processing unit 20 calculates a level difference Δa of each pixel in a corresponding position of the images 1 and 2 (images A and B). In the case of an RGB color image, for example, when the color image 1 is R1, G1 and B1, the color image 2 is R2, G2 and B2 and a pixel position is x, y, the level difference Δa is calculated by the following Expression (1).

$$\Delta a = |R_1(x,y) - R_2(x,y)| + |G_1(x,y) - G_2(x,y)| + |B_1(x,y) - B_2(x,y)| \quad \text{[Expression 1]}$$

(S22) Then the processing unit 20 calculates the edge intensity Δb of a target pixel and pixels in four peripheral positions around the target pixel. If it is assumed that a 3×3 pixel matrix exists, where the center is a target pixel T, as shown in FIG. 6, then four pixels P1 to P4 existing in the longitudinal directions in x and y directions from the center pixel T are the evaluation targets. In the case of an RGB image, when the color image 2 is R2, G2 and B2, a target pixel position is x, y, and a one adjacent pixel position is x+1, y, then the edge intensity value Δb is calculated by the following Expression (2).

$$\Delta b = |R_2(x+1,y) - R_2(x,y)| + |G_2(x+1,y) - G_2(x,y)| + |B_2(x+1,y) - B_2(x,y)| \quad \text{[Expression 2]}$$

The edge intensity is higher as this edge intensity value Δb is higher. As shown in FIG. 6, the edge intensity value Δb is calculated for each of the four adjacent pixels P1 to P4 of the target pixel T. In other words, four edge intensity values Δb are calculated.

(S24) Then the processing unit 20 calculates a similarity evaluation degree d, using the following Expression (3).

$$d = \frac{\Delta a}{1 + |\Delta b|} \quad \text{[Expression 3]}$$

Since Δb is calculated at four peripheral positions, F(i, j)={(i+1, j), (i, j+1), (i−1, j), (i, j−1)}, four evaluation degrees d are calculated. Therefore a minimum value of the four evaluation degrees d is determined, and this value is used for the similarity evaluation. This evaluation degree d becomes higher as the edge intensity Δb is lower and the level difference Δa is greater, as Expression (3) shows. In other words, the similarity becomes low if the position is not an edge. The minimum value is used because one with high similarity (low evaluation degree) is extracted out of the four evaluation degrees d.

(S26) When a combining method is changed according to the similarity, the similarity evaluation degree is compared with a threshold which is preset. In other words, the processing unit 20 compares the evaluation degree d extracted in step S24, with a predetermined threshold dth. The processing unit 20 judges a pixel of which evaluation degree d is lower than a threshold dth as an area of which similarity evaluation degree is high (an area of which similarity is high). The processing unit 20 judges a pixel of which evaluation degree d is higher than the threshold dth as an area of which similarity evaluation degree is low (an area of which similarity is low). The result judged in this way is represented in pixel or area units for one screen, as shown in the above mentioned evaluation map in FIG. 2. In FIG. 2, an area of which similarity is judged as high is indicated in black, and an area of which similarity is judged as low is indicated in white.

(S28) The processing unit 20 judges whether or not processing completed for all the pixels of this one screen. If processing is not completed for all the pixels, processing returns to step S20. If processing is completed for all the pixels, the similarity evaluation processing ends.

Figure 8:
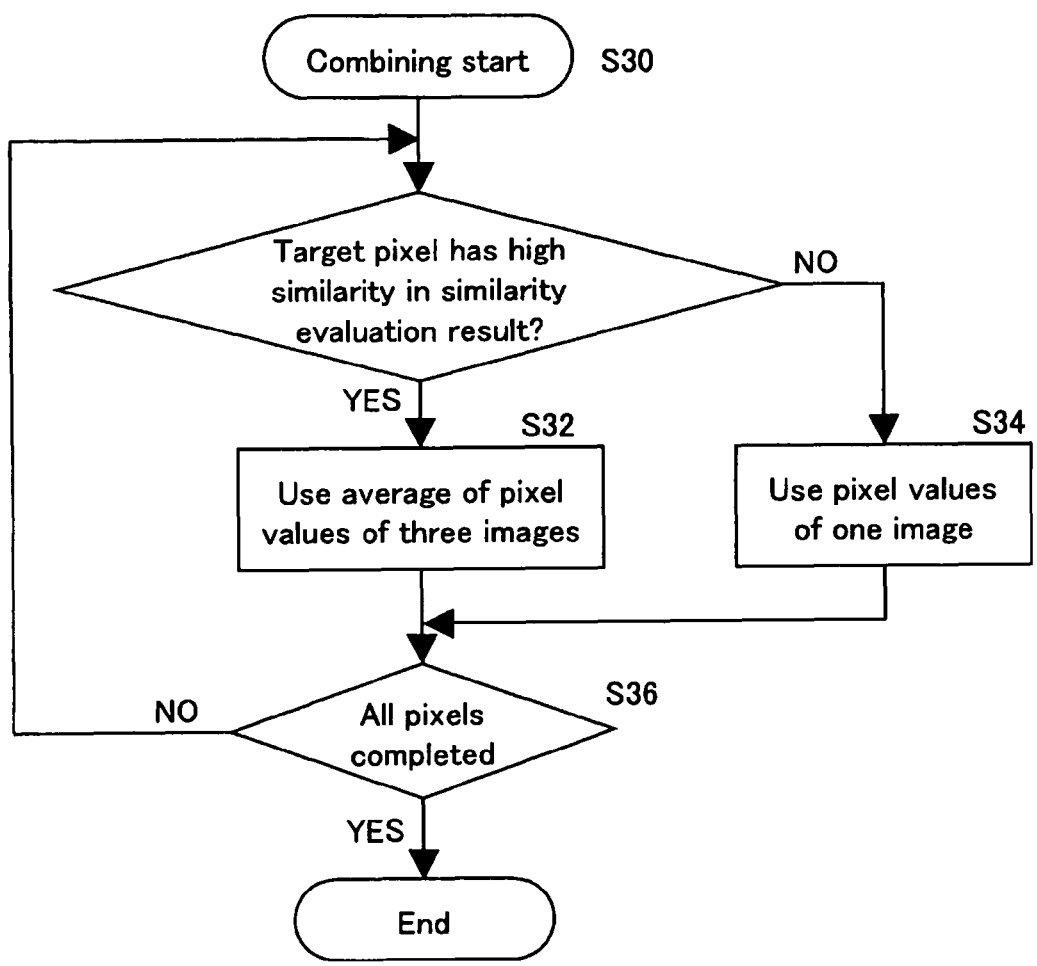
FIG. 8 is a flow chart depicting another combining method in FIG. 3.

FIG. 8 is a processing flow chart of another embodiment of the image combining processing in FIG. 3.

(S30) In the similarity evaluation result between images A and B (1 and 2), the processing unit 20 judges whether the similarity of the target pixel is high or low.

(S32) In order to change a combining method for the black area (area without movement) and the white area (area with movement), as shown in FIG. 2, the processing unit 20 calculates the average values of the pixel values of a plurality of images for the black area of which similarity is high (area without movement).

(S34) For the white area of which similarity is low (area with movement), on the other hand, the processing unit 20 uses pixel values of one image.

(S36) The processing unit 20 judges whether or not the processing is completed for all the pixels of the screen. If processing is not completed for all the pixels, processing returns to step S30. If processing is completed for all the pixels, the similarity evaluation processing ends.

As described above, a plurality of images are combined for an area without movement, so an image having no blurring with sufficient brightness is acquired, and one image is used for an area without movement, so an image having no blurring is acquired even if brightness drops. Since image combining is not executed for the area without movement, processing load can be decreased.

Similarity Evaluation Correction Method

Now the similarity evaluation correction processing described in FIG. 3 will be described. In the image combining processing based on this similarity evaluation, the image is separated into an area with movement and an area without movement, and a combining method is changed for each separated area, so the image quality may differ between these areas. In order to minimize this image quality difference, the similarity evaluation correction processing is performed.

Figure 9:
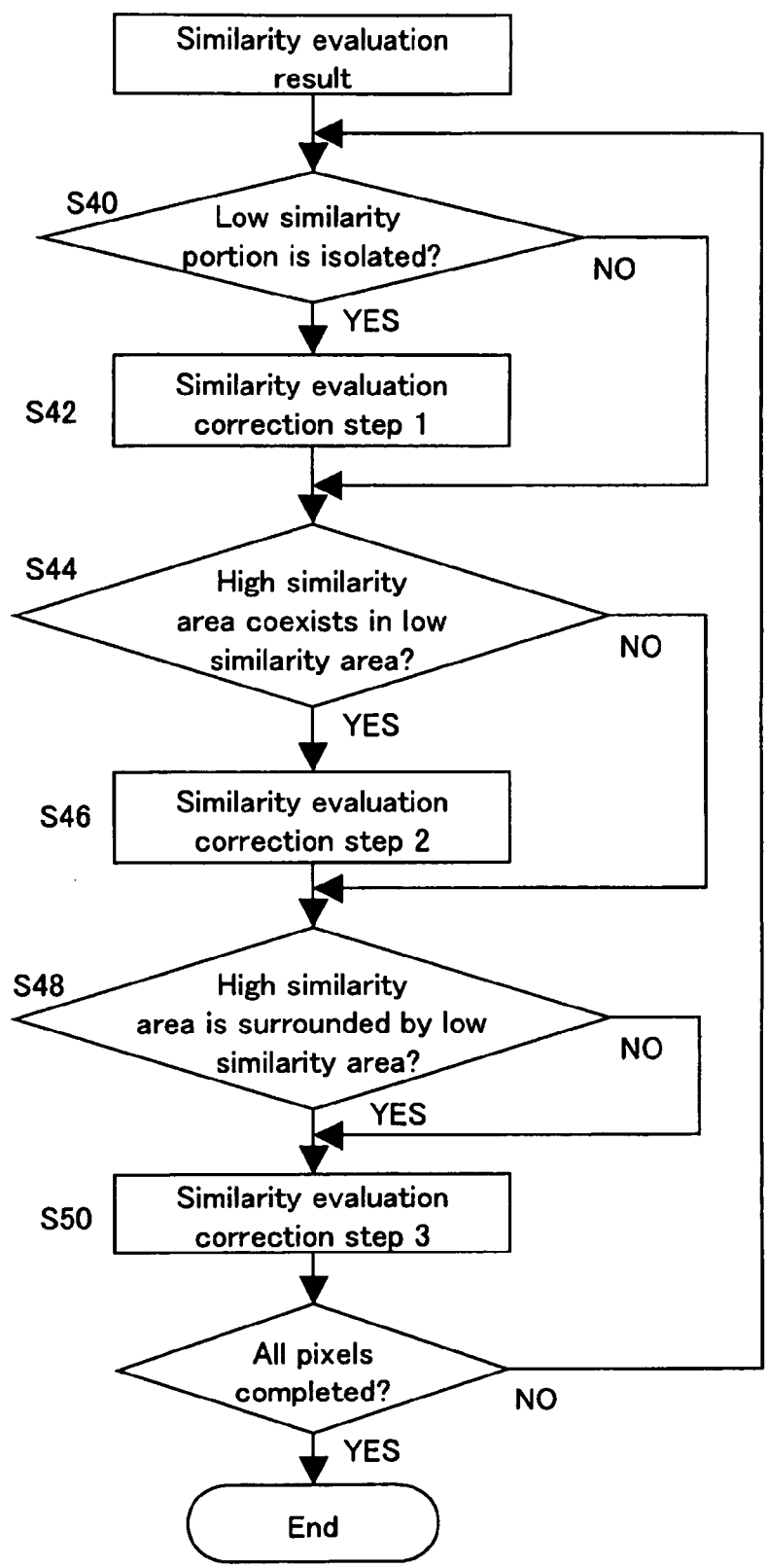
FIG. 9 is a processing flow chart of the similarity evaluation correction processing in FIG. 3.
Figure 10:
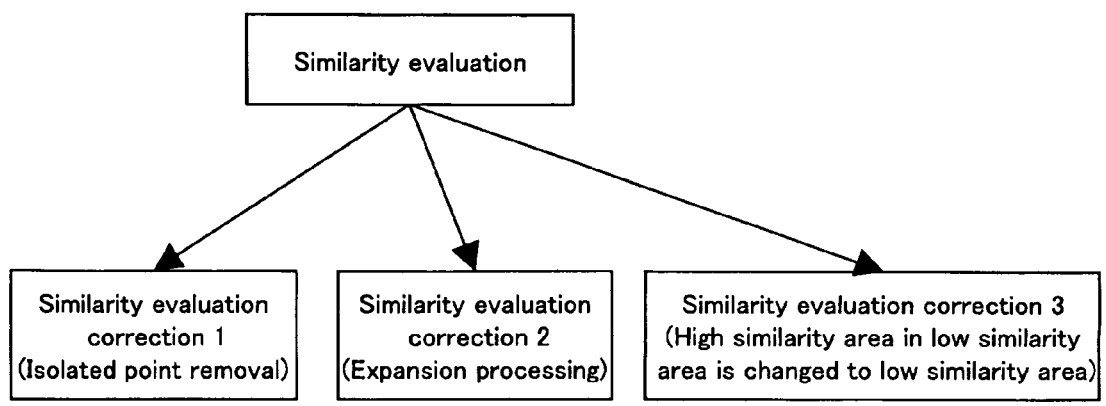
FIG. 10 is a diagram depicting the similarity evaluation processing in FIG. 9.
Figure 11:
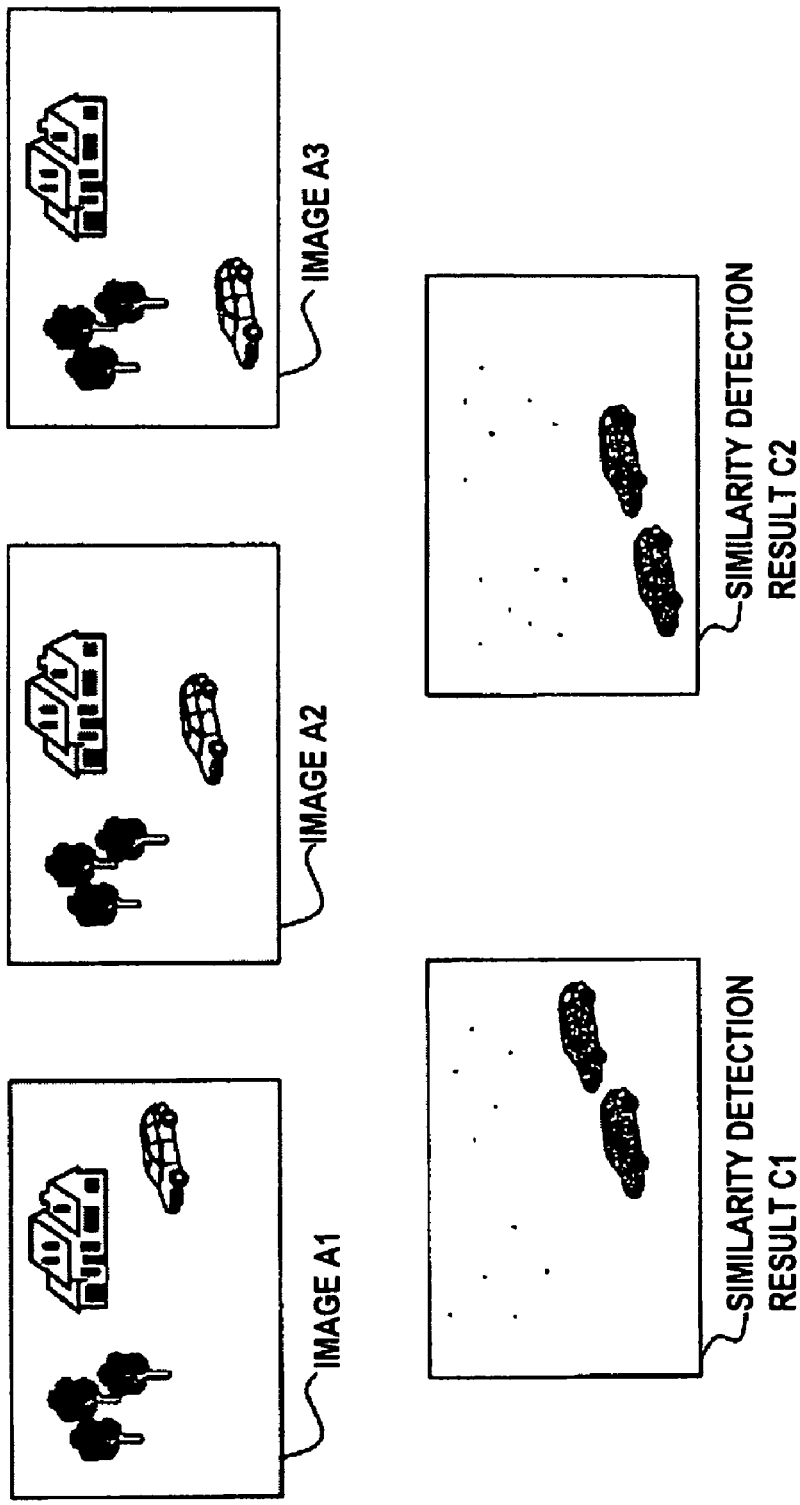
FIG. 11 shows sample image examples of the similarity evaluation result.
Figure 12:
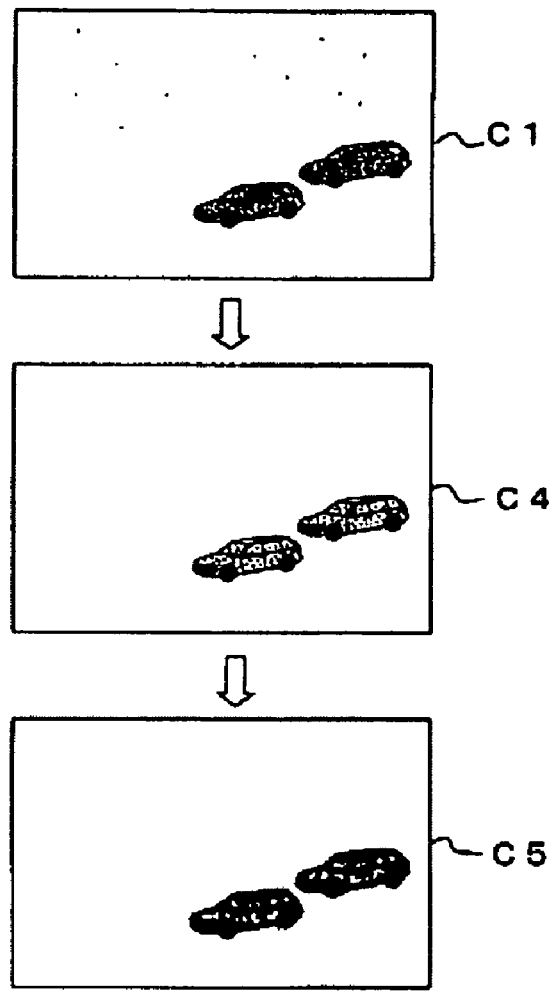
FIG. 12 is a diagram depicting the similarity evaluation correction result.
Figure 13:
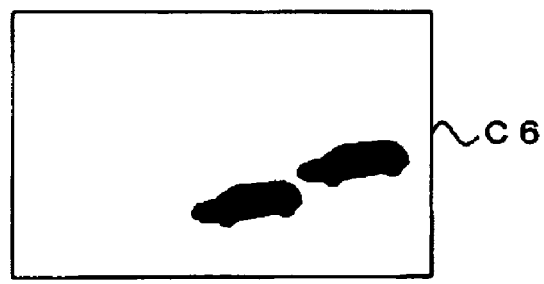
FIG. 13 is another diagram depicting the similarity evaluation correction result.

FIG. 9 is a flow chart depicting the similarity evaluation correction processing in FIG. 3, FIG. 10 is a diagram depicting the similarity evaluation processing in FIG. 9, FIG. 11 shows sample image examples of the similarity evaluation result, FIG. 12 shows images of the similarity evaluation correction result, and FIG. 13 shows another image of the similarity evaluation correction result.

After the similarity evaluation is executed, it is preferable to correct the similarity evaluation result, as shown in FIG. 9. As FIG. 10 shows, when an area with movement (white area in FIG. 2) exists as an isolated point, the isolated point, which is a micro area, need not be handled differently as an area of which similarity is low, since visibility is low. Hence the isolated point is removed as similarity evaluation correction 1. When an area of which similarity is high coexists around an area of which similarity is low, processing to expand a portion of which similarity is low (similarity evaluation correction 2) is performed, so as to prevent the generation of unnaturalness at the boundary of the area of which similarity is low and the area of which similarity is high when images are combined.

In some cases, in a same moving object (area with movement), similarity of a periphery of the moving object becomes low, and similarity of an area within the same object becomes high. In such a case, it is natural to perform a same processing for the entirety of the same moving object. Therefore an area of which similarity is high, which exists inside an area of which similarity is low, is replaced with an area of which similarity is low, that is, similarity evaluation correction 3 is performed. For both of these phenomena, it is not essential to perform the above mentioned handling, and one or both of these corrections may be omitted if priority is assigned to a short calculation time, for example.

The processing in FIG. 9 will be described with reference to FIG. 11 to FIG. 13.

(S40) The processing unit 20 judges whether a portion where similarity is low is isolated. Out of the three images A1, A2 and A3 in FIG. 11, for example, it is assumed that the similarity evaluation result of images A1 and A2 is C1, and the similarity evaluation result of images A2 and A3 is C2. In the similarity evaluation result C1, an area of which similarity is low (black dots) exists as an isolated point in an area of which similarity is high (white area in FIG. 11). Specifically, the processing unit 20 searches an isolated point of which similarity is low in the area of which similarity is high by scanning with a 3×3 mask filter, for example.

(S42) When an isolated point is discovered by the mask filter, the processing unit 20 removes the isolated point as a similarity evaluation correction 1, since such a micro area as an isolated point, of which visibility is low, need not be handled separately as an area of which similarity is low. For example, the processing unit 20 changes the similarity evaluation result of the isolated point to an area of which similarity is high. By this, the area of which similarity is low (black dots) in the similarity evaluation result C1 is changed to an area of which similarity is high, and isolated points are removed, as shown in C4 in FIG. 12.

(S44) Then the processing unit 20 judges whether or not there is an area of which similarity is low in the periphery and of which similarity is high inside thereof exists. An example of this is an area within the window of an automobile in the similarity evaluation results C1 and C4 in FIG. 11 and FIG. 12. Specifically, the processing unit 20 scans the area of which similarity is low with a 3×3 mask filter so as to search whether an area of which similarity is high exists.

(S46) When the processing unit 20 discovers an area of which similarity is low in the periphery and of which similarity is high inside thereof, the processing unit 20 performs a processing for expanding a portion of which similarity is low, so as to prevent the generation of unnaturalness at the boundary of the area of which similarity is low and the area of which similarity is high when the images are combined. In other words, the similarity evaluation correction 2, for expanding the area of which similarity is low, is executed. In the expansion processing, when the similarity is low in the periphery and the similarity is high in the inside thereof, the pixel of which similarity is low is expanded, for example, and one pixel of which similarity is low is expanded to 3×3 pixels of which similarity is low, so as to replace pixels of which similarity is high. By this, in the similarity evaluation result C4, the area of which similarity is low is expanded, and the portion of which similarity is high is replaced, as shown in C5 in FIG. 12.

(S48) Then the processing unit 20 judges whether or not an area of which similarity is high is surrounded by an area of which similarity is low. An example of this is the inside of an automobile in the similarity evaluation results C1 and C4 in FIG. 11 and FIG. 12. Specifically, the processing unit 20 scans the area of which similarity is low with a 3×3 mask filter, so as to search whether an area of which similarity is high exists.

(S50) When the processing unit 20 detects that an area of which similarity is high is surrounded by an area of which similarity is low, the processing unit 20 performs a processing for changing the area of which similarity is high, existing in the area of which similarity is low, to an area of which similarity is low, since it is more natural that the entirety of a same moving object is processed by a same processing. In other words, the area of which similarity is high is changed to (replaced with) an area of which similarity is low in the similarity evaluation result.

According to an example of the similarity evaluation result in FIG. 12, the black areas (areas of which similarity is low) are dotted in the white area (area of which similarity is high) in the evaluation result C1 before correction. By performing the isolated point removal processing, the black areas (areas of which similarity is low) dotted in the white area (area of which similarity is high) are removed, as shown in the evaluation result C4.

When the expansion processing is further performed in this state, the area inside the window part of the automobile in the similarity evaluation result C4 is changed to a black area (area of which similarity is low), as shown in the evaluation result C5. When an expansion processing using contour tracking is performed as shown in FIG. 13, the entire automobile is changed to a black area (area of which similarity is low), as shown in the evaluation result C6. In this way, image combining is performed using the corrected evaluation similarity result (evaluation result C in FIG. 2).

As mentioned above, a different combining method is used for an area with movement and an area without movement. In FIG. 13, the black area is an area of which similarity is low, which is the opposite of FIG. 2, weighted average addition processing is performed for a plurality of images in the white area (area of which similarity is high), just like FIG. 2, and only one image is used (or the weight of one image is increased) for the black area, just like FIG. 3 or FIG. 8. For example, when three images, image 1, image 2 and image 3, are combined, just like FIG. 3, the images are combined with weights shown in FIG. 7. In this case, the weight of the boundary portion is smoothed and combined so that the boundary of black and white becomes continuous.

As described above, according to the present embodiment, an image can be improved by image combining even if blurring, due to a position shift of background, and object blurring, due to the movement of the object, exist.

Second Embodiment of Image Processing Method

Figure 14:
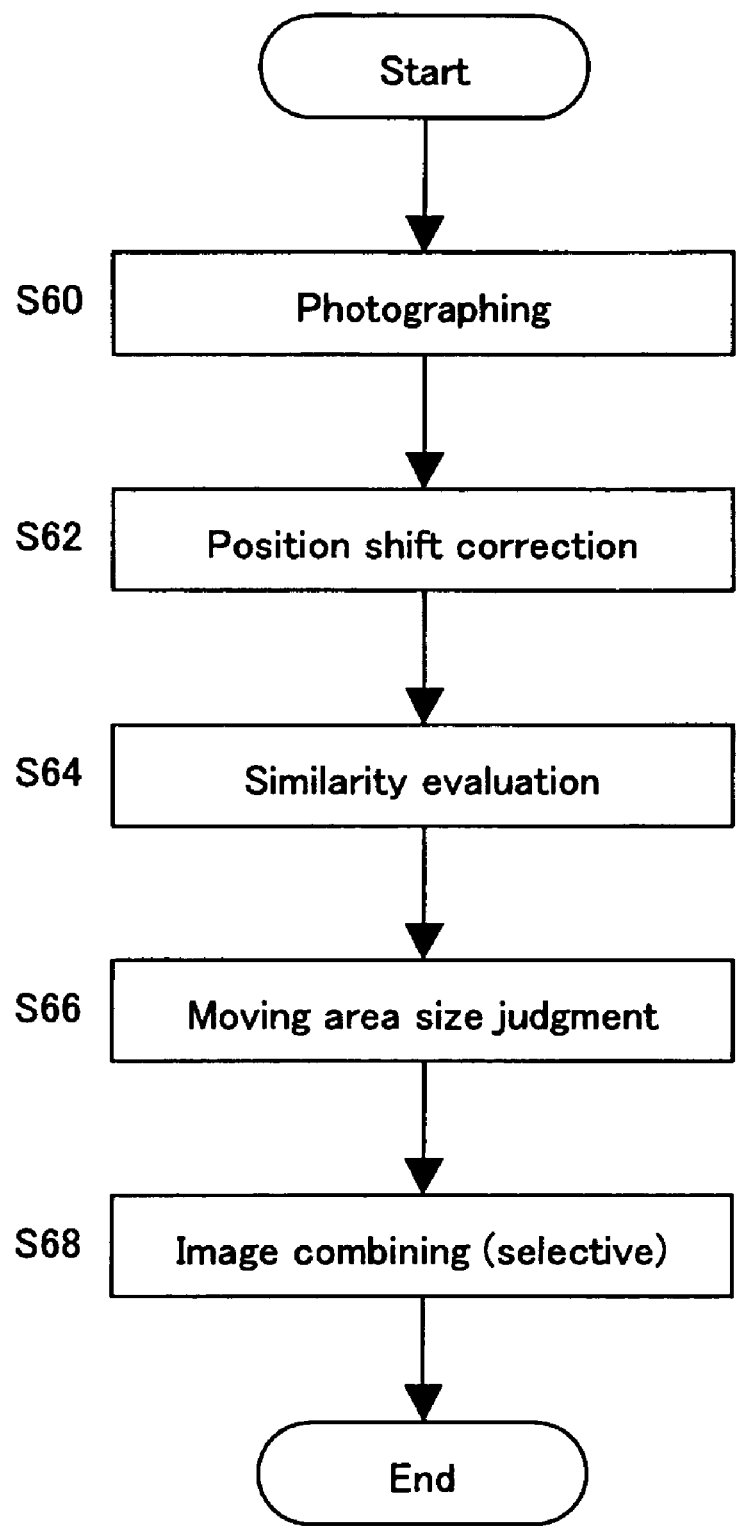
FIG. 14 is a processing flow chart of a second embodiment of the image processing of the present invention.
Figure 15:
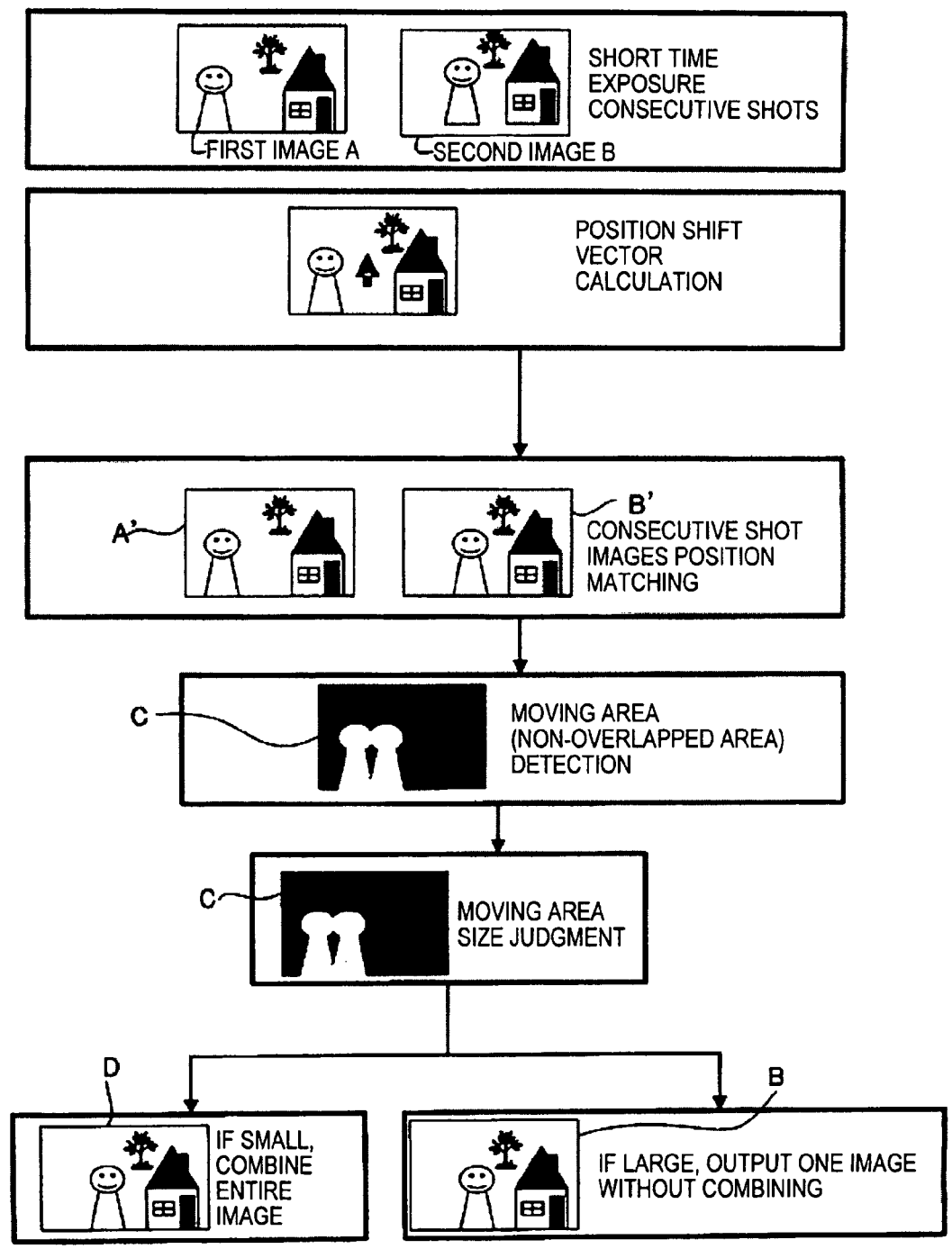
FIG. 15 is a diagram depicting the image processing of the second embodiment according to the image processing of the present invention.

FIG. 14 is a processing flow chart of a second embodiment of the image processing of the present invention, and FIG. 15 is a diagram depicting the image processing method of FIG. 14.

The image processing of the present embodiment will now be described with reference to FIG. 14.

(S60) Images are shot by a digital camera. In this case, when a shutter is pressed once, the digital camera performs a plurality of short time exposure shooting, and acquires a plurality of consecutive images A and B.

(S62) A processing unit 20 corrects the position shift of two images. Here the above mentioned KLT transform is used. According to a KLT transform, the characteristic points of two images are extracted and tracked to detect a position shift, and the position shift is corrected. The position shift correction method, however, is not limited to this method.

(S64) Then the processing unit 20 evaluates a similarity between images A' and B' for which position shift was corrected, and distinguishes between an area without movement and an area with movement. To evaluate the similarity, either or both of a level difference and edge intensity of each pixel of both images are used. In an actual image, a portion of which edge intensity is high may have a great level difference even if the similarity is high, so evaluation based on both the level difference and edge intensity is preferable. The present embodiment, however, is not limited to this method, but a method using only the level difference or a method using a difference of grades of the brightness change, for example, may be used.

(S66) The similarity evaluation result C between the images A' and B' is represented by black and white areas, as shown in FIG. 15. In the evaluation result C in FIG. 15, a black area is an area without movement for which the shift was corrected, and a white area is an area which has movement (which does not overlap) even after shift correction was performed. The processing unit 20 judges the size of the area which has movement (white area). For example, the processing unit 20 counts the number of bits of the pixels in the white area.

(S68) The processing unit 20 combines the images selectively according to the size judgment result in step S66. In the present embodiment, the processing unit 20 judges whether or not the size of an area with movement is greater than a predetermined size, and if the size of the area with movement is greater than the predetermined size, the images are not combined, and one image (e.g. second image B) is output. If the size of the area with movement is not greater than (is smaller than) the predetermined size, the plurality of images are combined. This combining processing is the same for the black area (area without movement) and white area (area with movement), and the entirety of images are combined.

In this similarity evaluation result C, the isolated points may be removed from an area without movement (overlapped area), as described in the above mentioned similarity evaluation correction processing.

In this way, one short exposure image is selected if the size of the area with movement is large, so compared with the first embodiment, image quality drops but processing load can be decreased, and multi-shots can be prevented. When the area with movement is small, a plurality of short exposure images are combined, so multi-shots can be prevented, and a high quality image can be acquired.

Figure 16:
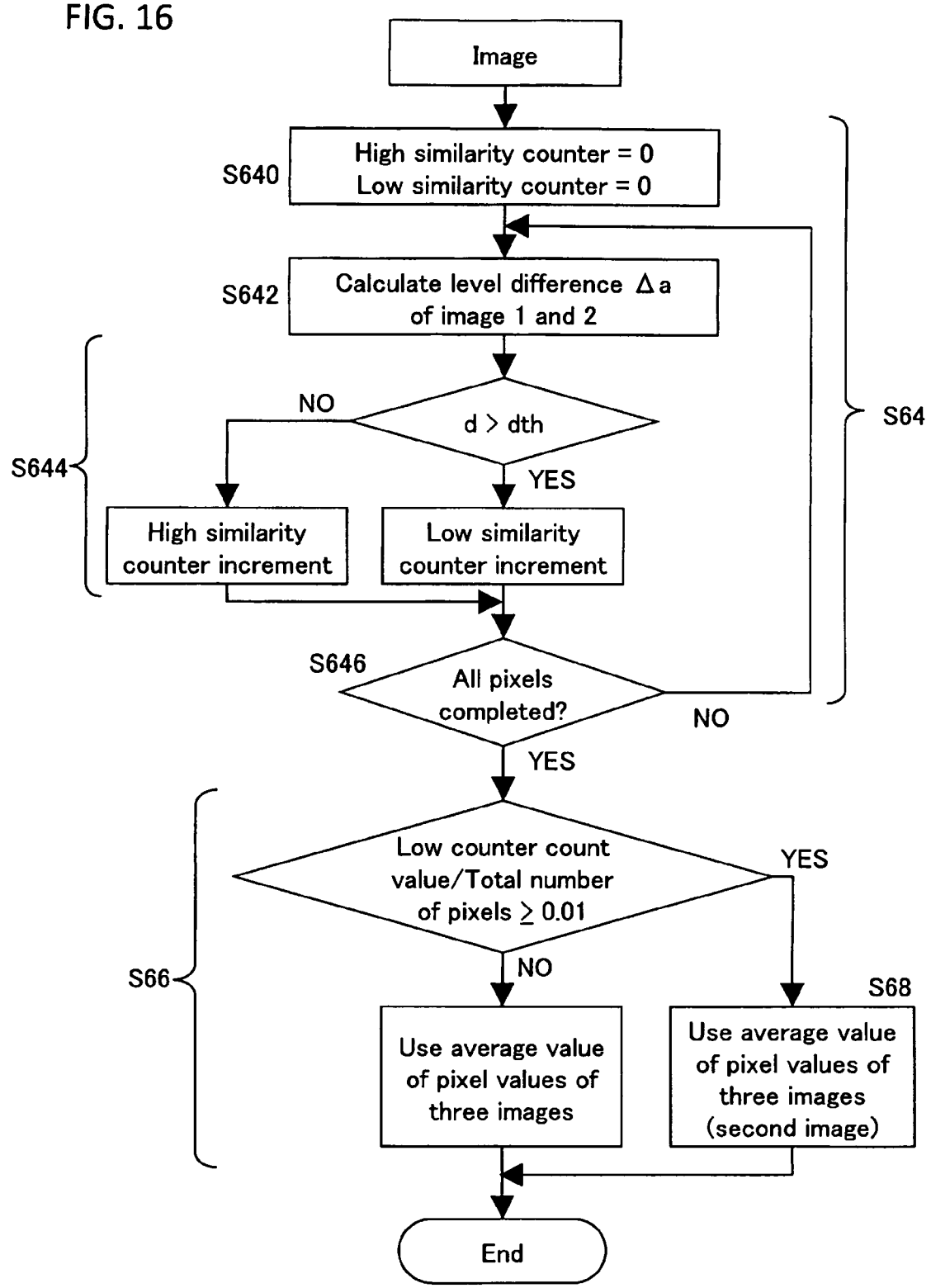
FIG. 16 is a flow chart depicting details of the image processing in FIG. 14.
Figure 17:
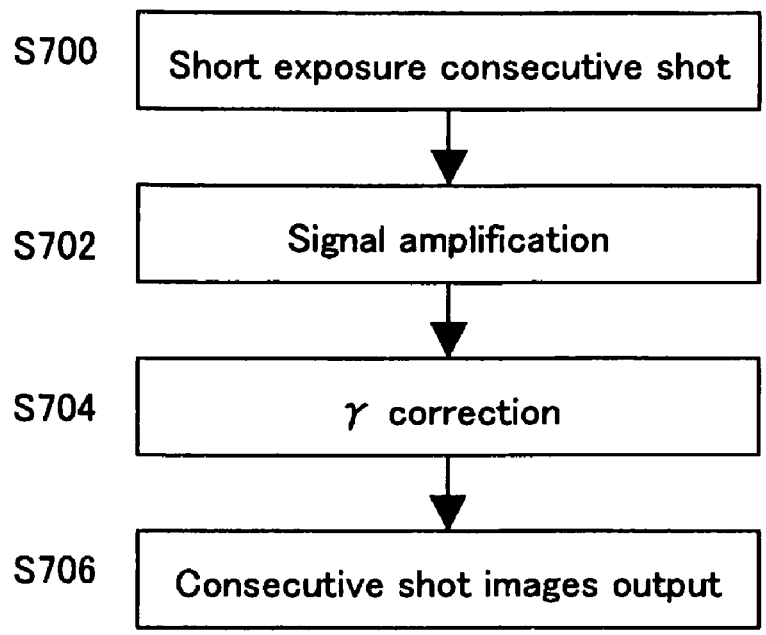
FIG. 17 is a flow chart depicting an imaging capturing processing for the combining processing in FIG. 16.
Figure 18:
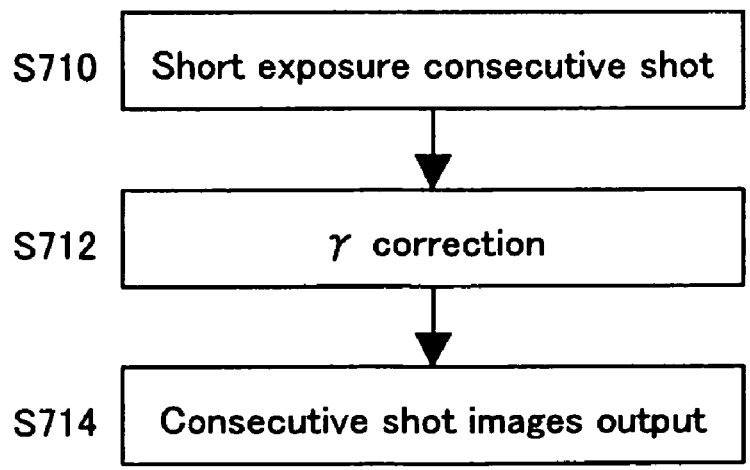
FIG. 18 is a flow chart depicting another image capturing processing for the combining processing in FIG. 16.
Figure 19:
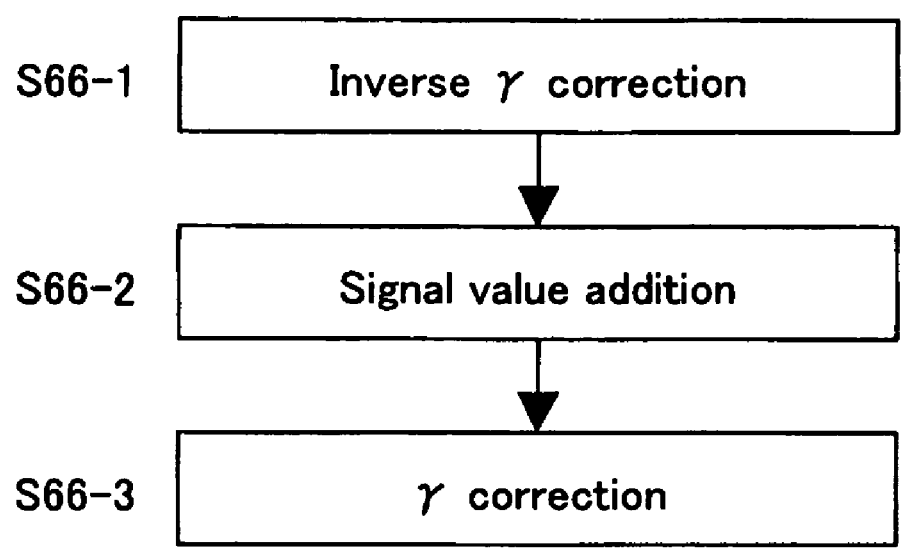
FIG. 19 is a flow chart depicting the combining processing in FIG. 16 for the image capturing processing in FIG. 18.

Now the above mentioned similarity evaluation step, the movement area size judgment step, and the combining step will be described in detail with reference to FIG. 16 to FIG. 19. FIG. 16 is a processing flow chart of an embodiment of the similarity evaluation step, the movement area size judgment step and the combining step in FIG. 14, FIG. 17 is an image capturing processing flow chart depicting the combining processing in FIG. 16, FIG. 18 is another image capturing processing flow chart depicting the combining processing in FIG. 16, and FIG. 19 is a combining processing flow chart when the image capturing processing in FIG. 18 is used.

The similarity evaluation step S64, the judgment step S66 and the combining step S68 in FIG. 14 will now be described in detail with reference to FIG. 16.

(S640) First the processing unit 20 initializes a high similarity counter for counting a number of pixels of which similarity is high, and a low similarity counter for counting a number of pixels of which similarity is low to "0".

(S642) The processing unit 20 calculates a level difference Δa of each pixel in a corresponding position of images 1 and 2 (images A and B). In the case of an RGB color image, for example, when the color image 1 is R1, G1 and B1, the color image 2 is R2, G2 and B2, and a pixel position is x, y, the level difference Δa is calculated by the above mentioned Expression (1).

(S644) In order to evaluate the similarity of this pixel, the level difference Δa is compared with a preset threshold value dth. In other words, the processing unit 20 compares the level difference Δa extracted in step S642 and a predetermined threshold value dth. When the level difference Δa of a pixel is smaller than a threshold dth, the processing unit 20 judges it as an area of which similarity evaluation degree is high (area of which similarity is high), and increments the high similarity counter. When a level difference Δa of a pixel is greater than the threshold value dth, the processing unit 20 judges it as an area of which similarity evaluation degree is low (area of which similarity is low), and increments the low similarity counter. The result judged like this is represented in pixel or area units for one screen, as shown in the above mentioned evaluation map in FIG. 2. In FIG. 2, an area of which similarity is judged as high is indicated in black, and an area of which similarity is judged as low is indicated in white.

(S646) The processing unit 20 judges whether or not processing completed for all the pixels of this one screen. If processing is not completed for all the pixels, processing returns to step S642. If processing is completed for all the pixels, the similarity evaluation processing ends.

(S66) The processing unit 20 calculates the ratio of the area of which similarity is low to the entire image, and judges whether the ratio is a predetermined value or more. In other words, the processing unit 20 calculates the ratio by dividing the count value of the low similarity counter by the number of pixels of the entire image (sum of the count values of the high similarity counter and the low similarity counter). The processing unit 20 judges whether this ratio is a predetermined value (0.01=1% in this case) or more. When this ratio is smaller than the predetermined value, the processing unit 20 calculates an average value of the pixel value of each pixel of the three images, creates one combined image, and ends the processing.

(S68) If the ratio is greater than the predetermined value, on the other hand, the processing unit 20 uses one image and does not perform combining processing. In this case, the second image is used.

As described above, a plurality of images are combined when the similarity between short exposure images is high, so an image without blurring can be acquired with sufficient brightness, and when the similarity is low, one image is used, so an image without blurring is acquired even if brightness drops slightly. Moreover, the images of which similarity is low are not combined, which contributes to decreasing the processing load.

Since the judgment is based on the level difference, the load of similarity judgment can be decreased, and since images are combined based on the average value of the pixel value of each pixel, the processing load can be further decreased.

The average value of the pixel values of the image is calculated when short exposure is used, and the brightness of the consecutive shot images is set for short exposure by such a function as AE (Auto Exposure) functions appropriate for short exposure. In other words, this is a case when the AE function, where a digital camera performs short exposure consecutive shooting (S700), then performs signal amplification (S702), then γ correction (S704), and outputs the consecutive images (S706), is set as shown in FIG. 17.

On the other hand, if an AE function, the same as the one used for the case of normal exposure, not short exposure, is set when short exposure consecutive shooting is performed, the digital camera performs short exposure consecutive shooting (S710), then performs γ correction (S712), and outputs consecutive images (S714) as shown in FIG. 18. In this way, if an AE function, which is appropriate for short exposure consecutive shooting, is not set when short exposure consecutive shooting is performed, distortion appears if only a simple average value calculation is used.

Therefore the image combining step in step S66 in FIG. 16 is changed, as shown in FIG. 19. First inverse γ correction is performed for the level value of each image (e.g. raise the value to 2.2th power if γ=2.2) (S66-1), then the signal value of each image after the inverse γ correction is added (S66-2), and γ correction (½.2th power) is performed again (S66-3).

Third Embodiment of Image Processing Method

FIG. 20 is a processing flow chart of the third embodiment of the image processing method according to the present invention, FIG. 21 shows a table of increment values thereof, and FIG. 22 to FIG. 25 are diagrams depicting the operation thereof in FIG. 20. FIG. 20 is a processing flow chart of a variant form of the similarity evaluation step in FIG. 14 and FIG. 16.

(S648) First a processing unit 20 initializes a high similarity counter for counting a number of pixels of which similarity is high, and a low similarity counter for counting a number of pixels of which similarity is low to "0".

(S650) The processing unit 20 calculates a level difference $\Delta a$ of each pixel in a corresponding position of images 1 and 2 (images A and B). In the case of an RGB color image, for example, if the color image 1 is R1, G1 and B1, the color image 2 is R2, G2 and B2, and a pixel position is x, y, and the level difference $\Delta a$ is calculated by the above mentioned Expression (1).

(S652) In order to evaluate the similarity of this pixel, the level difference $\Delta a$ is compared with a preset threshold value dth. In other words, the processing unit 20 compares the level difference $\Delta a$ extracted in step S650 and a predetermined threshold value dth. If the level difference $\Delta a$ of a pixel is smaller than a threshold dth, the processing unit 20 judges the pixel as an area of which similarity evaluation degree is high (area of which similarity is high), and increments the high similarity counter. If the level difference $\Delta a$ of a pixel is greater than the threshold value dth, the processing unit 20 judges the pixel as an area of which similarity evaluation degree is low (area of which similarity is low). Then the processing unit 20 refers to a table TB in FIG. 21 using a ratio resulting when the absolute value of the level difference $\Delta a$ is divided by the threshold dth, and decides a corresponding increment value. The processing unit 20 increments the low similarity counter using this increment value.

(S654) The processing unit 20 judges whether processing completed for all the pixels of this one screen. If processing is not completed for all the pixels, processing returns to step S650. If processing is completed for all the pixels, the similarity evaluation processing ends.

Figure 22:
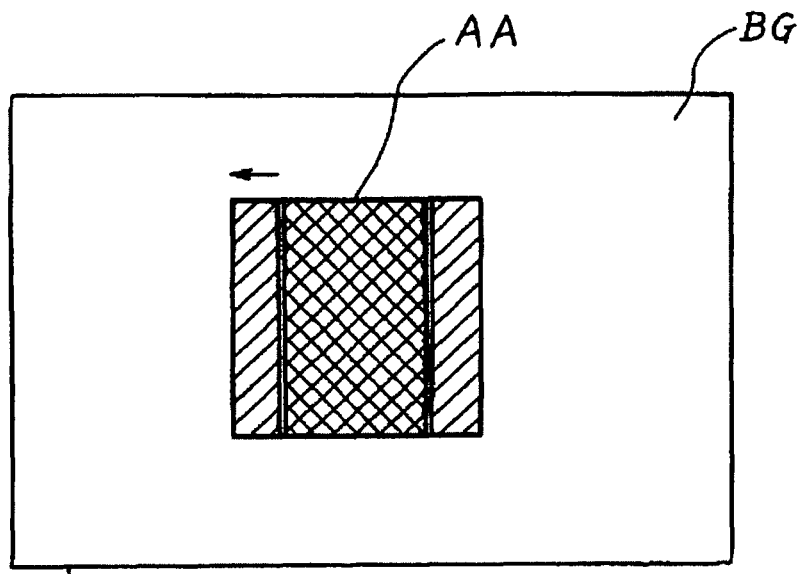
FIG. 22 is a diagram depicting a captured image of the image processing in FIG. 20.
Figure 23:
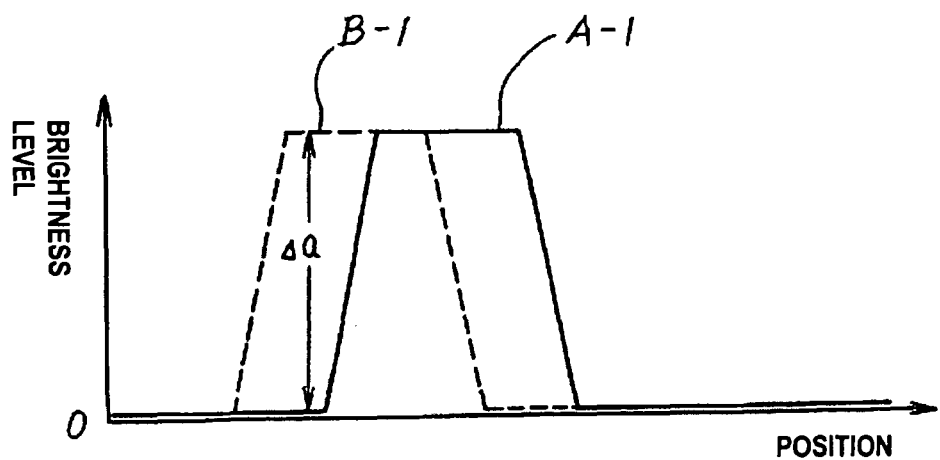
FIG. 23 is a diagram depicting a level distribution of the captured image in FIG. 22.

According to this table TB, a greater increment value is set as the ratio of the level difference is greater. In other words, if the level difference is greater than the threshold, the value of the pixels are counted giving weight to the level difference according to the value of the level difference. The weight is increased more as the level difference deviates from the threshold, and values for pixels are counted. Because values for pixels are counted with weighing, an image, of which level difference is high and multi-shots stand out, can be effectively detected. This will be described with reference to FIG. 22 to FIG. 25. FIG. 22 is an example when an object AA, of which color is relatively dark, appears on a white background BG in the image capturing range. In this case, if a camera is shaken, the level difference $\Delta a$ between the first image level A-1 and the second image level B-1 is great, as shown in FIG. 23.

Figure 24:
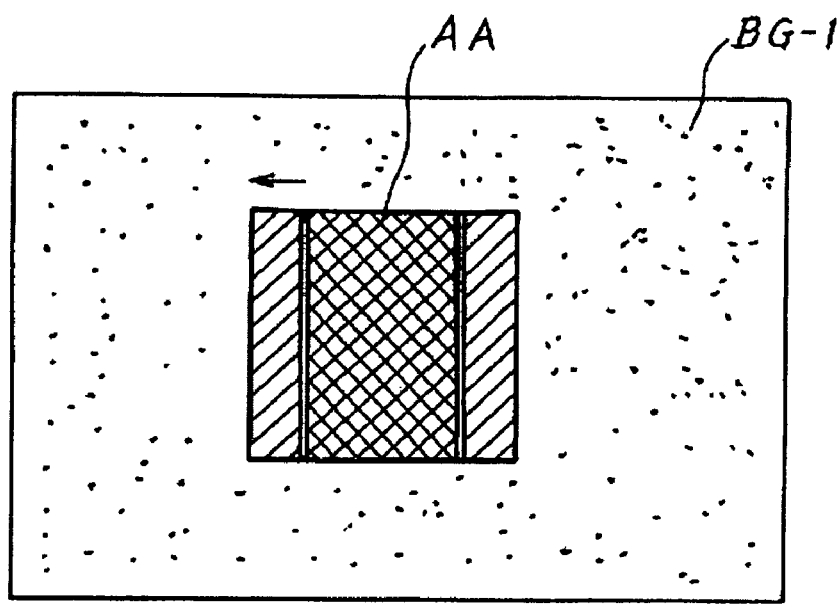
FIG. 24 is a diagram depicting another captured image of the image processing in FIG. 20.
Figure 25:
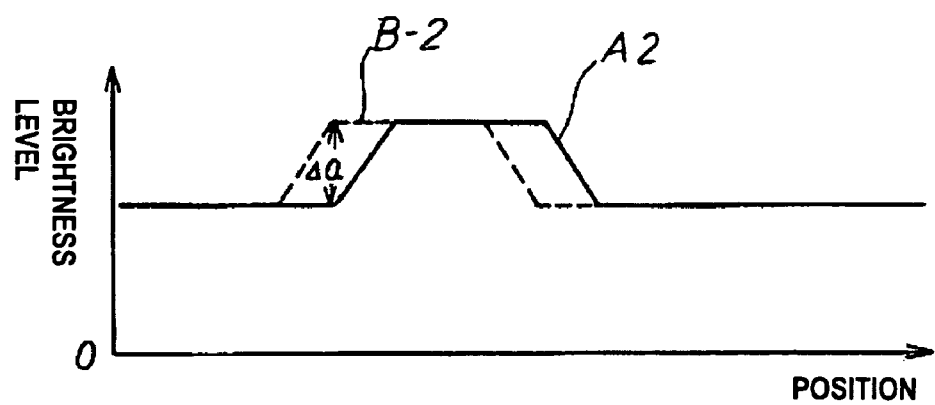
FIG. 25 is a diagram depicting a level distribution of the captured image in FIG. 24.

FIG. 24 is an example when an object AA, of which color is relatively dark, appears in a colored background BG-1 in the image capturing range. In this case, if a camera is shaken, the level difference $\Delta a$ between the first image level A-2 and the second image level B-2 is small, as shown in FIG. 25.

In the case of the image capturing target in FIG. 22, multi-shots due to camera shaking stand out, and in the case of the image sensing target in FIG. 24, multi-shots due to a camera shaking do not stand out. When the number of pixels is counted with increasing a weight as the level difference of the pixel deviates from the threshold, as shown in FIG. 20, an image, of which level difference is great and multi-shots stand out, as shown in FIG. 22 and FIG. 23, can be effectively detected. For the captured images in FIG. 24 and FIG. 25, on the other hand, of which level difference is greater than the threshold but is small, normal weight is used.

Fourth Embodiment of Image Processing Method

Figure 26:
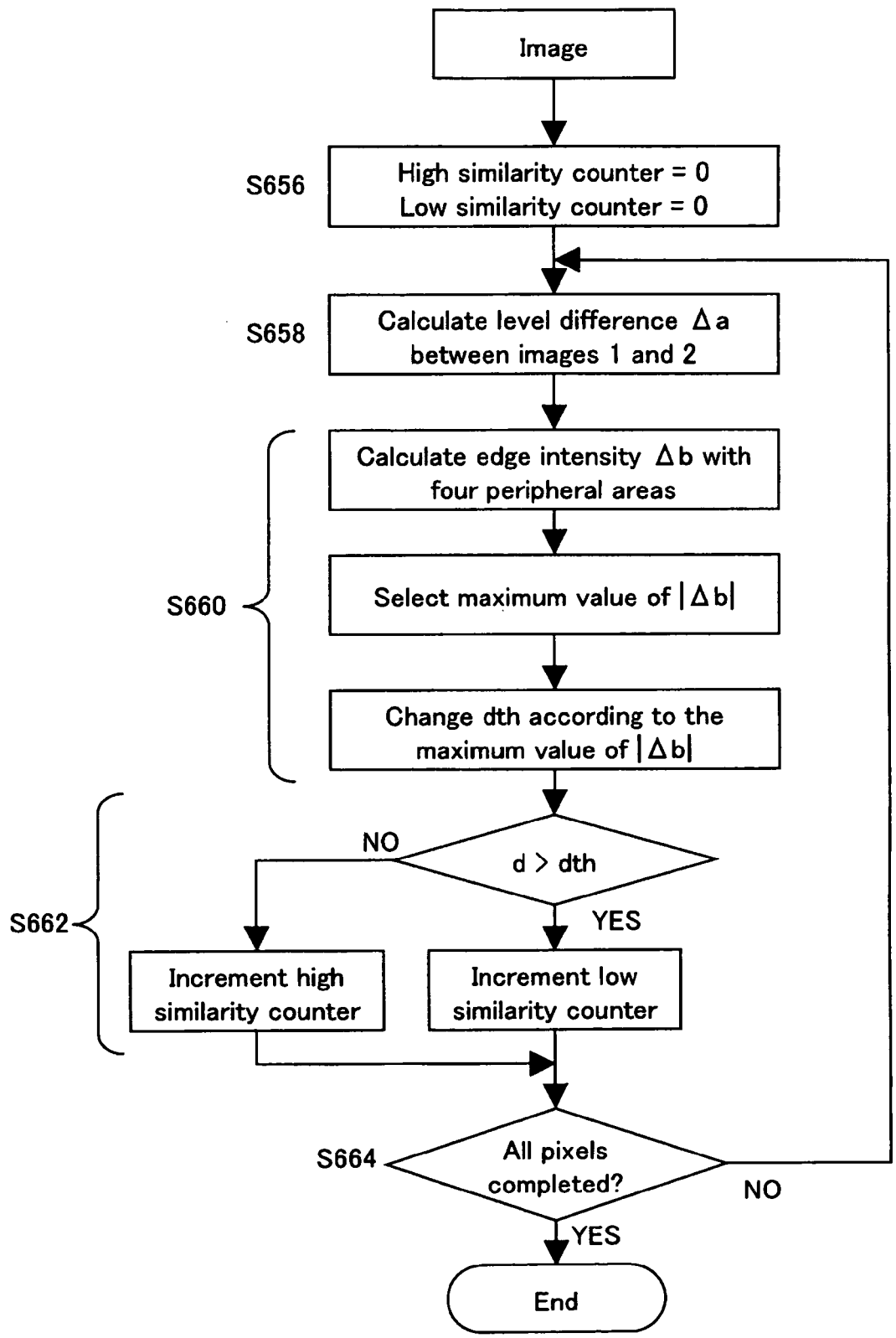
FIG. 26 is a processing flow chart of a fourth embodiment of the image processing of the present invention.
Figure 27:
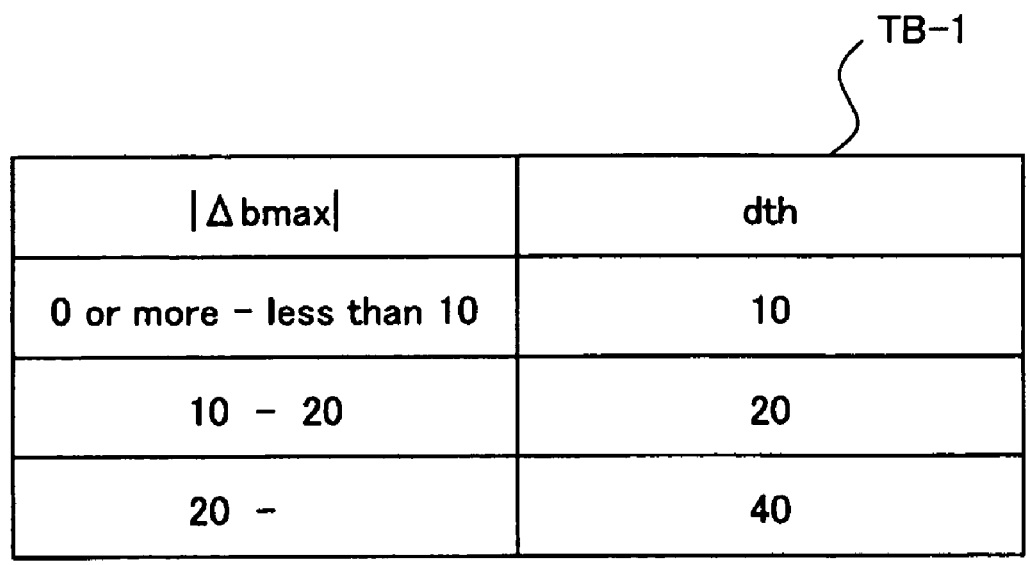
FIG. 27 is a diagram depicting a threshold table in FIG. 26.
Figure 28:
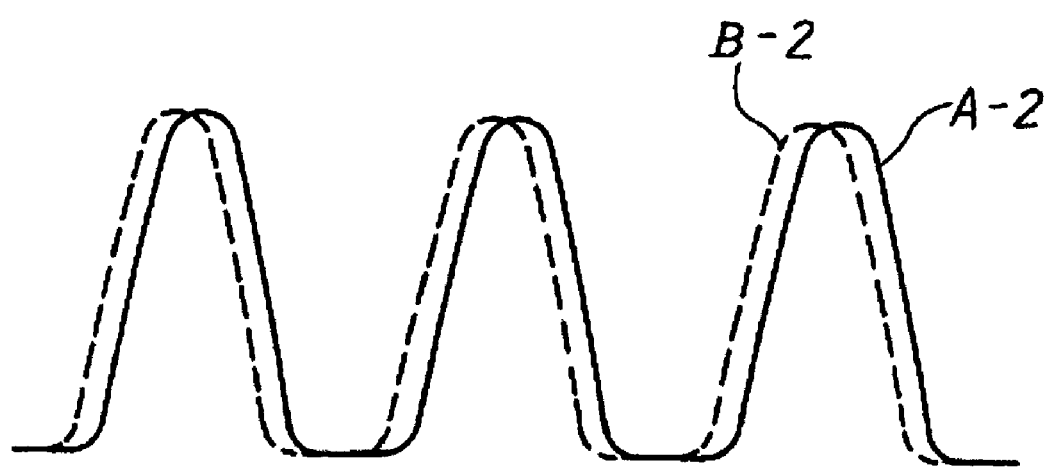
FIG. 28 is a diagram depicting the image processing of the fourth embodiment in FIG. 26.

FIG. 26 is a processing flow chart of a fourth embodiment of the image processing of the present invention, FIG. 27 shows a table of increment values thereof, and FIG. 28 is a diagram depicting the operation of FIG. 26. FIG. 26 is a processing flow chart of another variant form of the similarity evaluation step in FIG. 14 and FIG. 16.

(S656) First a processing unit 20 initializes a high similarity counter for counting a number of pixels of which similarity is high, and a low similarity counter for counting a number of pixels of which similarity is low to "0".

(S658) The processing unit 20 calculates a level difference $\Delta a$ of each pixel in a corresponding position of the images 1 and 2 (images A and B). In the case of an RGB color image, for example, if the color image 1 is R1, G1 and B1, the color image 2 is R2, G2 and B2, and a pixel position is x, y, the level difference $\Delta a$ is calculated by the above mentioned Expression (1).

(S660) Then the processing unit 20 calculates an edge intensity $\Delta b$ between a target pixel and four peripheral pixels of the target pixel. In the case of a 3×3 pixel matrix of which center is a target pixel T, as shown in FIG. 6, the four pixels P1 to P4, which are neighbors positions in the x and y directions of the center pixel T respectively, are the evaluation targets. In the case of an RGB image, if the color image 2 is R2, G2 and B2, a target pixel position is x, y, and one adjacent pixel position is x+1, y, the edge intensity value Δb is calculated using the above mentioned Expression (2).

As this edge intensity Δb is greater, the edge intensity is higher. As shown in FIG. 6, the edge intensity value Δb is calculated for each of the four adjacent pixels P1 to P4 of the target pixel T. In other words, four edge intensity values Δb are calculated. Then a maximum value of the four edge intensity absolute values Δb is selected. Using this maximum value of the absolute values Δb, a table TB-1 in FIG. 27 is referred to, and the threshold dth is decided. In this table TB-1, the threshold dth is set to be greater as the edge intensity is higher.

(S662) In order to evaluate the similarity of this pixel, the level difference Δa is compared with a threshold dth acquired from the table TB-1. In other words, the processing unit 20 compares the level difference Δa extracted in step S658 and a threshold dth decided based on the edge intensity. If the level difference Δa of a pixel is smaller than a threshold dth, the processing unit 20 judges the pixel as an area of which similarity evaluation degree is high (area of which similarity is high), and increments the high similarity counter. If a level difference Δa of a pixel is greater than the threshold value dth, the processing unit 20 judges the pixel as an area of which similarity evaluation degree is low (area of which similarity is low), and increments the low similarity counter.

(S664) The processing unit 20 judges whether processing completed for all the pixels of this one screen. If processing is not completed for all the pixels, processing returns to step S648. If processing is completed for all the pixels, the similarity evaluation processing ends.

In this table TB-1, a greater threshold is set as the edge intensity (that is, image grade) is higher. In other words, the threshold of the similarity judgment is changed by the edge grade of the image. As the edge grade is greater, a greater threshold is set. As FIG. 28 shows, the level difference of the first image signal A-2 and the second signal B-2 becomes high near the edge in the case of an image with many edges, even if the shift of image signal A-2 of the first image and image signal B-2 of the second image is slight. Therefore pixels, which shift slightly, are counted as pixels of which similarity is low.

In the present embodiment, the threshold is increased if edge intensity is high, so it can be prevented that pixels of a non-overlapped area near the edge are over counted as a pixel of which similarity is low. In other words, it is prevented that pixels of an image with many edges are excessively counted as a pixel of which similarity is low.

Fifth Embodiment of Image Processing Method

Figure 29:
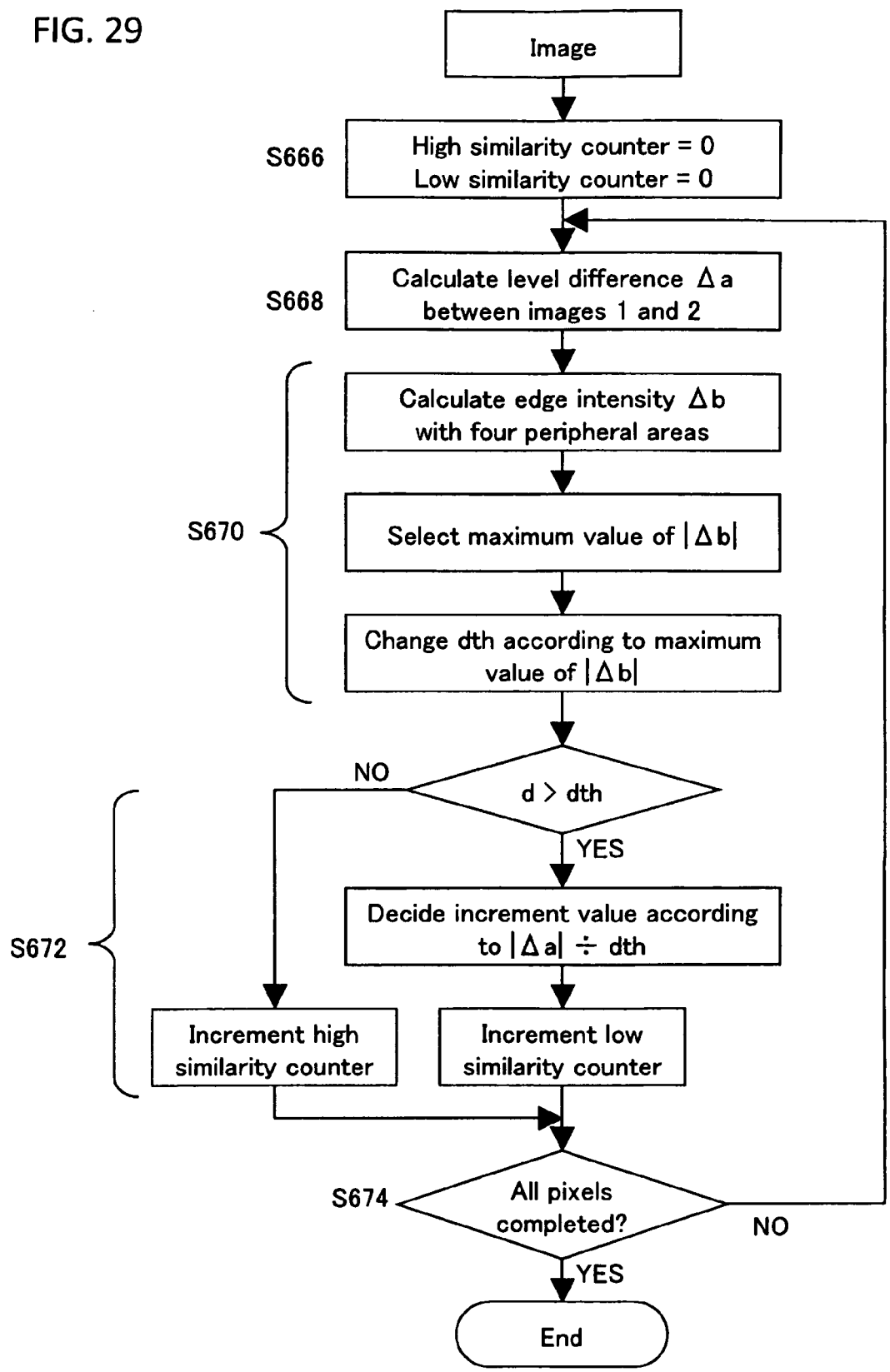
FIG. 29 is a processing flow chart of a fifth embodiment of the image processing of the present invention.
Figure 30:
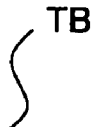
FIG. 30 is a diagram depicting an increment table in FIG. 29.
Figure 31:
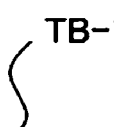
FIG. 31 is a diagram depicting a threshold table in FIG. 29.
Figure 32:
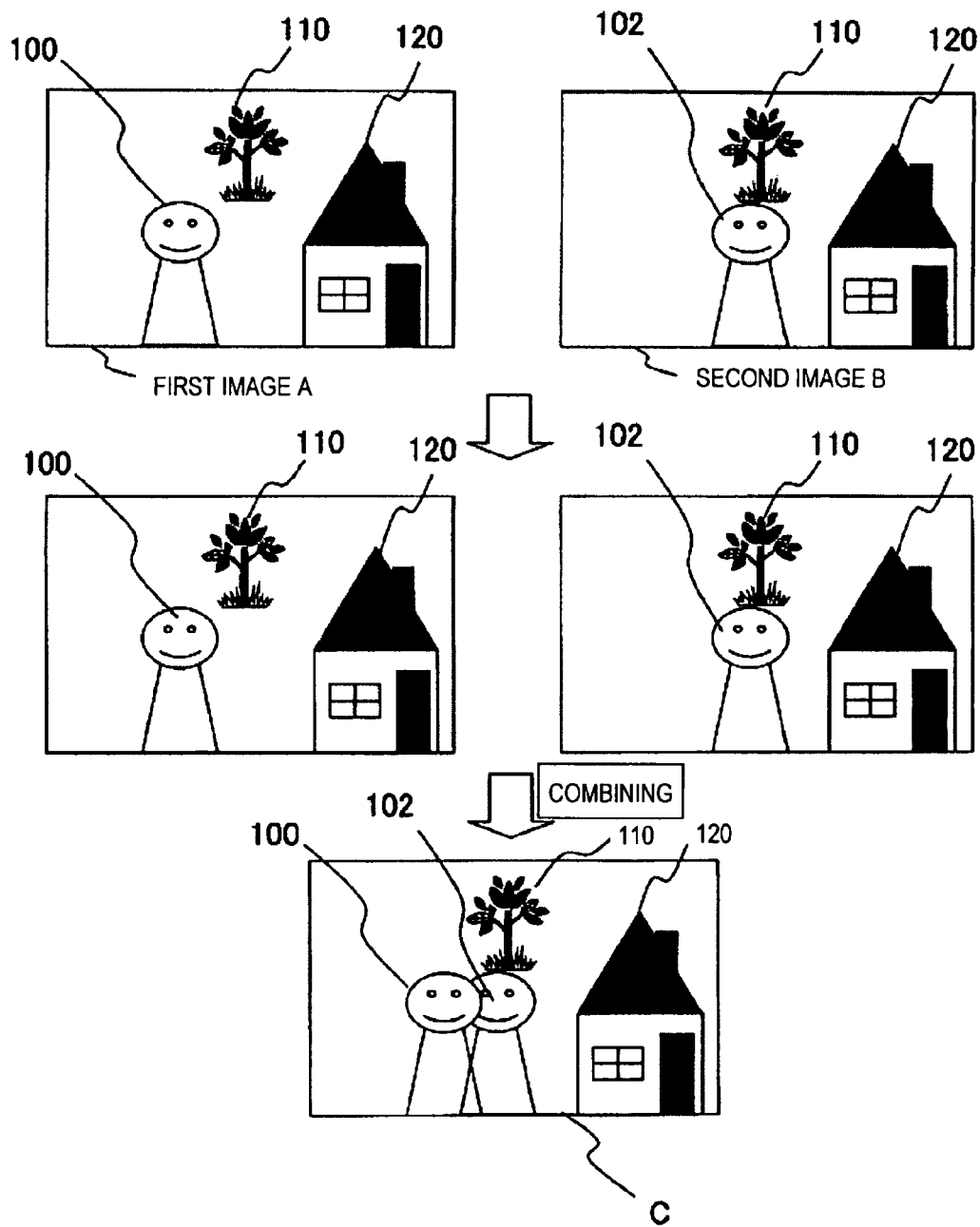
FIG. 32 is a diagram depicting a first image combining method according to a prior art.

FIG. 29 is a processing flow chart of a fifth embodiment of the image processing of the present invention, FIG. 30 shows a table of increment values thereof, and FIG. 31 shows a threshold table thereof. FIG. 29 is a processing flow chart of still another variant form of the similarity evaluation step in FIG. 14 and FIG. 16, and is a combination of the embodiments in FIG. 20 and FIG. 26.

(S666) First a processing unit 20 initializes a high similarity counter for counting a number of pixels of which similarity is high, and a low similarity counter for counting a number of pixels of which similarity is low to "0".

(S668) The processing unit 20 calculates a level difference Δa of each pixel in a corresponding position of the images 1 and 2 (the images A and B). In the case of an RGB color image, for example, if the color image 1 is R1, G1 and B1, the color image 2 is R2, G2 and B2, and a pixel position is x, y, the level Δa is calculated by the above mentioned Expression (1).

(S670) Then the processing unit 20 calculates an edge intensity Δb between a target pixel and peripheral pixels 4. In the case of a 3×3 pixel matrix of which center is a target pixel T, as shown in FIG. 6, the four pixels P1 to P4 which are adjacent positions in the x and y directions of the center pixel T respectively are the evaluation targets. In the case of an RGB image, if the image 2 is R2, G2 and B2, a target pixel position is x, y, and one adjacent pixel position is x+1, y, the edge intensity Δb is calculated using the above mentioned Expression (2).

As this edge intensity value Δb is greater, the edge intensity is higher. The edge intensity value Δb is calculated for each of the four adjacent pixels P1 to P4 of the target pixel T, as shown in FIG. 6. In other words, four edge intensity values Δb are calculated. Then a maximum value of the four edge intensity absolute values Δb is selected. By this maximum value of the absolute values Δb, a table TB-1 in FIG. 31 is referred to, and the threshold dth is decided. In this table TB-1, the threshold dth is set to be greater as the edge intensity is higher.

(S672) In order to evaluate the similarity of this pixel, the level difference Δa is compared with a threshold dth acquired from the table TB-1. In other words, the processing unit 20 compares the level difference Δa extracted in step S668 and threshold dth decided based on the edge intensity. If the level difference Δa of a pixel is smaller than a threshold dth, the processing unit 20 judges the pixel as an area of which similarity evaluation degree is high (area of which similarity is high), and increments the high similarity counter. If a level difference Δa of a pixel is greater than the threshold value dth, the processing unit 20 judges the pixel as an area of which similarity evaluation degree is low (area of which similarity is low). Then the processing unit 20 refers to the table TB in FIG. 30 using a ratio resulting when the absolute value of the level difference Δa is divided by the threshold dth, and decides a corresponding increment value. The processing unit 20 increments the low similarity counter using this increment value.

(S674) The processing unit 20 judges whether processing completed for all the pixels of this one screen. If processing is not completed for all the pixels, processing returns to step S668. If processing is completed for all the pixels, the similarity evaluation processing ends.

In Table TB in FIG. 30, a greater increment value is set as the ratio of the level difference is higher. In other words, if the level difference is greater than a threshold, weight according to the level difference according is provided to the value of the level difference, and pixels are counted. The weight is greater as a pixel deviates more from the threshold. By counting pixels with adding weight, an image of which level difference is great and multi-shots stand out can be effectively detected.

In Table TB-1 in FIG. 31, a greater threshold is set as the edge intensity (that is, image grade) is higher. In other words, the threshold of the similarity judgment is changed by the edge grade of the image. As the edge grade is greater, a greater threshold is set. This means that if the edge intensity is high, the threshold is increased so that it can be prevented that pixels of a non-overlapped area near the edge are over counted as a pixel of which similarity is low. In other words, it is prevented that pixels of an image with many edges are excessively counted as a pixel of which similarity is low.

Other Embodiments

In the above embodiments, the present invention was described as a combination of two images, but this invention can also be applied to combining three or more images. A part or all of the similarity evaluation correction steps may be omitted. The similarity evaluation uses both level difference detection and edge intensity detection, but either may be used.

The similarity evaluation is not limited to pixel units, but can also be applied to a unit of an area comprised of a plurality of continuous pixels or a pixel block.

The present invention was described using embodiments, but the present invention can be modified in various ways within the scope of the spirit of the present invention, and these [variant forms] shall not be excluded from a scope of the present invention.

Industrial Applicability

When a plurality of images are combined, a position shift of the images is detected and corrected, and after the position shift is corrected, the similarity of images is evaluated, and the image combining method is changed according to the similarity, so it is possible to create an image having no position shift, due to shaking of a camera, and object blurring, due to the movement of an object. Moreover, whether the images are combined or not is determined according to the similarity, so the processing load is reduced, and an image having no object blurring can be created.

The invention claimed is:

1. An image processing method for overlapping and combining a plurality of images sharing a photograph range, the image processing method comprising:
    calculating a position shift parameter between the plurality of images;
    correcting the position shift between the plurality of images using the position shift parameter;
    evaluating similarity of each portion of the plurality of images after the correction between the plurality of images by
        calculating a level difference and edge intensity of the portion of the plurality of images; and
        evaluating the similarity by the level difference and the edge intensity;
    changing a combining method or a combining parameter of the plurality of images according to the similarity evaluation result; and
    combining the plurality of images after the correction by the changed combining method or a combining parameter.

2. The image processing method according to claim 1, wherein the similarity evaluation comprises evaluating whether the similarity between portions of the plurality of images is high or low, and
    wherein the combining comprises:
        combining images using pixel values of one of the plurality of images for an area the similarity of which is low, and
        combining images using pixel values of the plurality of images for an area the similarity of which is high.

3. The image processing method according to claim 1, wherein the similarity evaluation comprises
    calculating a level difference and a plurality of edge intensities of the portions of the plurality of images;
    calculating a plurality of similarity degree based on the level difference and the plurality of edge intensities; and
    evaluating the similarity by a highest similarity degree among the plurality of similarity degree.

4. The image processing method according to claim 1, wherein the similarity evaluation comprises:
    evaluating that the similarity is low when the calculated level difference is great and the edge intensity is low; and
    evaluating that the similarity is high when the level difference is small and the edge intensity is high.

5. The image processing method according to claim 1, the image processing method further comprising removing noise from an area the similarity of which is low in the combined image.

6. The image processing method according to claim 1, the image processing method further comprising correcting a similarity evaluation of the similarity evaluation result, in order to improve image quality of the combined image.

7. The image processing method according to claim 6, wherein the similarity evaluation correction comprises:
    detecting that a portion the similarity of which is low exists as an isolated point in a portion of which the similarity is high; and
    changing the portion the similarity of which is low to a portion of which the similarity is high.

8. The image processing method according to claim 6, wherein the similarity evaluation correction comprises:
    detecting that an area of which similarity is high coexists around an area the similarity of which is low; and
    executing a processing for expanding the portion the similarity of which is low.

9. The image processing method according to claim 6, wherein the similarity evaluation correction comprises:
    detecting that a portion the similarity of which is high exists in an area surrounded by a portion the similarity of which is low; and
    changing the portion of which the similarity is regarded as high to a portion the similarity of which is low.

10. An image processing method for overlapping and combining a plurality of images sharing a photograph range, the image processing method comprising:
    calculating a position shift parameter between the plurality of images;
    correcting the position shift between the plurality of images using the position shift parameter;
    evaluating similarity of each portion of the plurality of images after the correction of the position shift;
    judging which executes combining processing of the plurality of images or selecting processing of one image among the images according to the similarity evaluation result;
    combining the plurality of images after the correction when judgment is made that the combining processing is executed; and
    selecting one image out of the plurality of images if judgment is made that the selecting processing is executed.

11. The image processing method according to claim 10, wherein the combining comprises combining based on a simple average or a weighted average of pixel level values of the plurality of images.

12. The image processing method according to claim 10, wherein the combining comprises combining based on the addition of a linear brightness signal value by the pixel level values of the plurality of images.

13. The image processing method according to claim 10, wherein the similarity evaluation comprises similarity evaluating based on a difference of the pixel level values of the plurality of images.

14. The image processing method according to claim 13, wherein the similarity evaluation comprises comparing the difference of pixel level values of the plurality of images with a threshold, and judging the similarity by the compared result.

15. The image processing method according to claim 14, wherein the similarity evaluation comprises comparing a difference of pixel level values of the plurality of images with a threshold determined according to a grade of the level of the image, and evaluating the similarity by the compared result.

16. The image processing method according to claim 10, wherein the judging is according to the number of pixels the similarity of which is judged as low.

17. The image processing method according to claim 16, wherein the judging is according to the result of adding the number of pixels, the similarity of which is judged as low, with a weight based on the level difference between pixels.

18. The image processing method according to claim 10, wherein the judging is according to the result of adding the number of pixels, the similarity of which is judged as low, with a weight based on the level difference between pixels.

19. An image processing device for overlapping and combining a plurality of images sharing a photograph range, the image processing device comprising:
  a memory that stores the plurality of images; and
  a processing unit that
    calculates a position shift parameter between the plurality of images in the memory,
    corrects the position shift between the plurality of images using the position shift parameter,
    evaluates similarity of portions of the plurality of images after the correction between the images for each portion of the images,
    changes a combining method or a combining parameter of the images according to the similarity evaluation result,
    combines the plurality of images after the correction,
    calculates a level difference and edge intensity of the portions of the plurality of images, and
    evaluates the similarity based on the level difference and the edge intensity.

20. The image processing device according to claim 19, wherein the processing unit evaluates whether the similarity between portions of the plurality of images is high or low, and combines images using pixel values of one of the plurality of images for an area the similarity of which is low, and combines using pixel values of the plurality of the images for an area the similarity of which is high.

21. The image processing device according to claim 19, wherein the processing unit
  calculates a level difference and a plurality of edge intensities of the portions of the plurality of images,
  calculates a plurality of similarity degree based on the level difference and a plurality of edge intensities and
  evaluates the similarity based on a highest similarity degree among the plurality of similarity degree.

22. The image processing device according to claim 19, wherein the processing unit evaluates that the similarity is low when the calculated level difference is great and the edge intensity is low, and evaluates that the similarity is high when the level difference is small and the edge intensity is high.

23. The image processing device according to claim 19, wherein the processing unit removes noise from the area the similarity of which is low, in the combined image.

24. The image processing device according to claim 19, wherein the processing unit corrects the similarity evaluation of the similarity evaluation result, in order to improve image quality of the combined image.

25. The image processing device according to claim 24, wherein the processing unit detects that a portion the similarity of which is low exists as an isolated point in a portion the similarity of which is high, and changes the portion the similarity of which is low to a portion the similarity of which is high, as the correction of the similarity evaluation.

26. The image processing device according to claim 24, wherein the processing unit detects that an area of which the similarity is high coexists around an area the similarity of which is low, and expands the portion of which the similarity is low, as the correction of the similarity evaluation.

27. The image processing device according to claim 24, wherein the processing unit detects that a portion the similarity of which is high exists in an area surrounded by a portion the similarity of which is low, and changes the portion the similarity of which is regarded as high to a portion the similarity of which is low.

28. An image processing device for overlapping and combining a plurality of images sharing a photograph range, comprising:
  a memory that stores the plurality of images; and
  a processing unit that
    calculates a position shift parameter between the plurality of images in the memory,
    corrects the position shift between the plurality of images using the position shift parameter,
    evaluates similarity of each portion of the plurality of images after the correction between the plurality of images,
    judges executing of a combining processing of the plurality of images or a selecting processing of one image among the plurality of images according to the similarity evaluation result, combines the plurality of images after the correction when judging that the combining processing is executed, and selects one image out of the plurality of images when judging that the selecting processing is executed.

29. The image processing device according to claim 28, wherein the processing unit executes the combining processing based on a simple average or a weighted average of pixel level values of the plurality of images.

30. The image processing device according to claim 28, wherein the processing unit executes the combining processing based on the addition of a linear brightness signal value by the pixel level values of the plurality of images.

31. The image processing device according to claim 28, wherein the processing unit evaluates the similarity based on a difference of pixel level values of the plurality of images.

32. The image processing device according to claim 31, wherein the processing unit compares a difference of pixel level values of the plurality of images with a threshold, and judges the similarity by the compared result.

33. The image processing device according to claim 32, wherein the processing unit compares the difference of pixel level values of the plurality of images with a threshold determined according to a grade of the level of the image, and evaluates the similarity by the compared result.

34. The image processing device according to claim 33, wherein the processing unit judges according to the result of adding the number of pixels, the similarity is of which judged as low, with weight based on the level difference between pixels.

35. The image processing device according to claim 28, wherein the processing unit judges according to the number of pixels the similarity of which is judged as low.

36. The image processing device according to claim 35, wherein the processing unit judges according to the result of adding the number of pixels, the similarity of which is judged as low, with weight based on the level difference between pixels.

37. The image processing device according to claim 28, wherein the processing unit outputs an image for which shake correction has been performed.

* * * * *